Aug. 15, 1967  L. MOLLON ET AL  3,335,983
AIRCRAFT CARGO LOADING SYSTEM AND COMPONENTS
Filed May 21, 1963  6 Sheets-Sheet 3
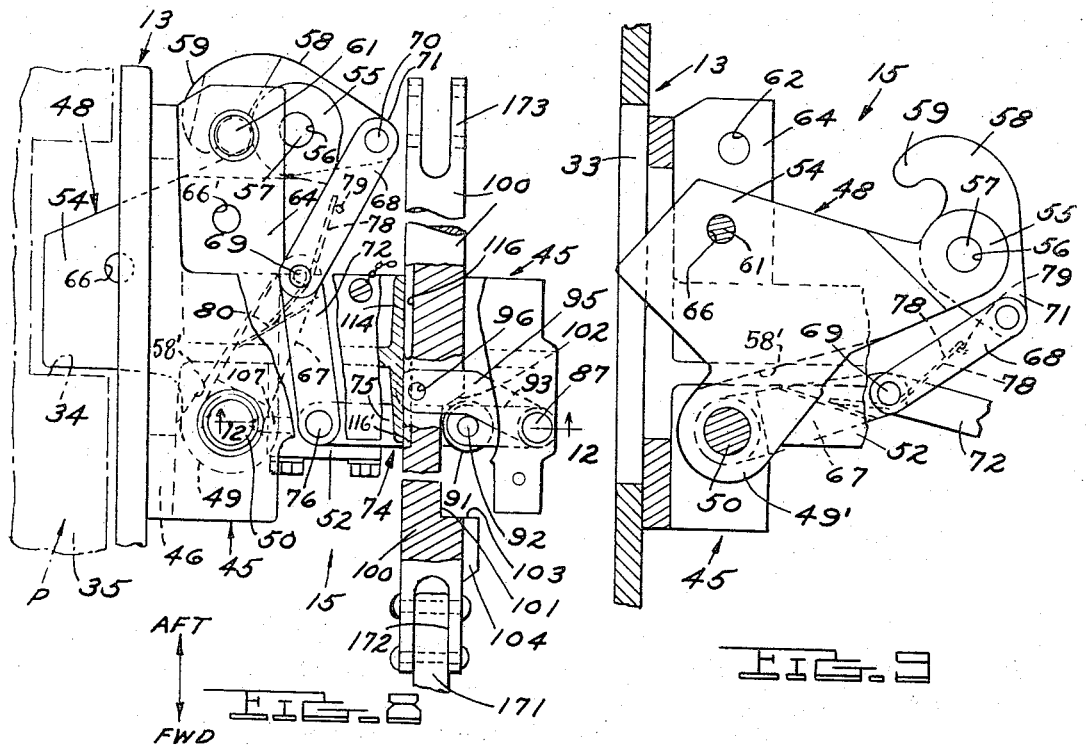
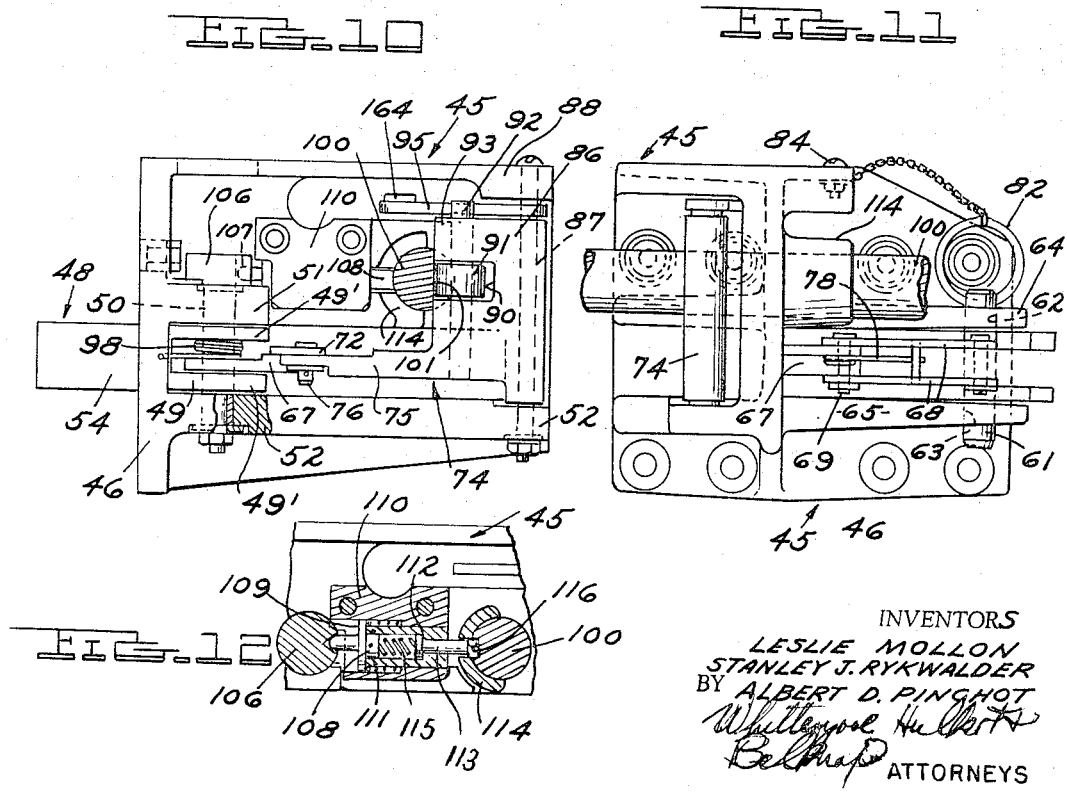
INVENTORS
LESLIE MOLLON
STANLEY J. RYKWALDER
BY ALBERT D. PINGHOT
ATTORNEYS

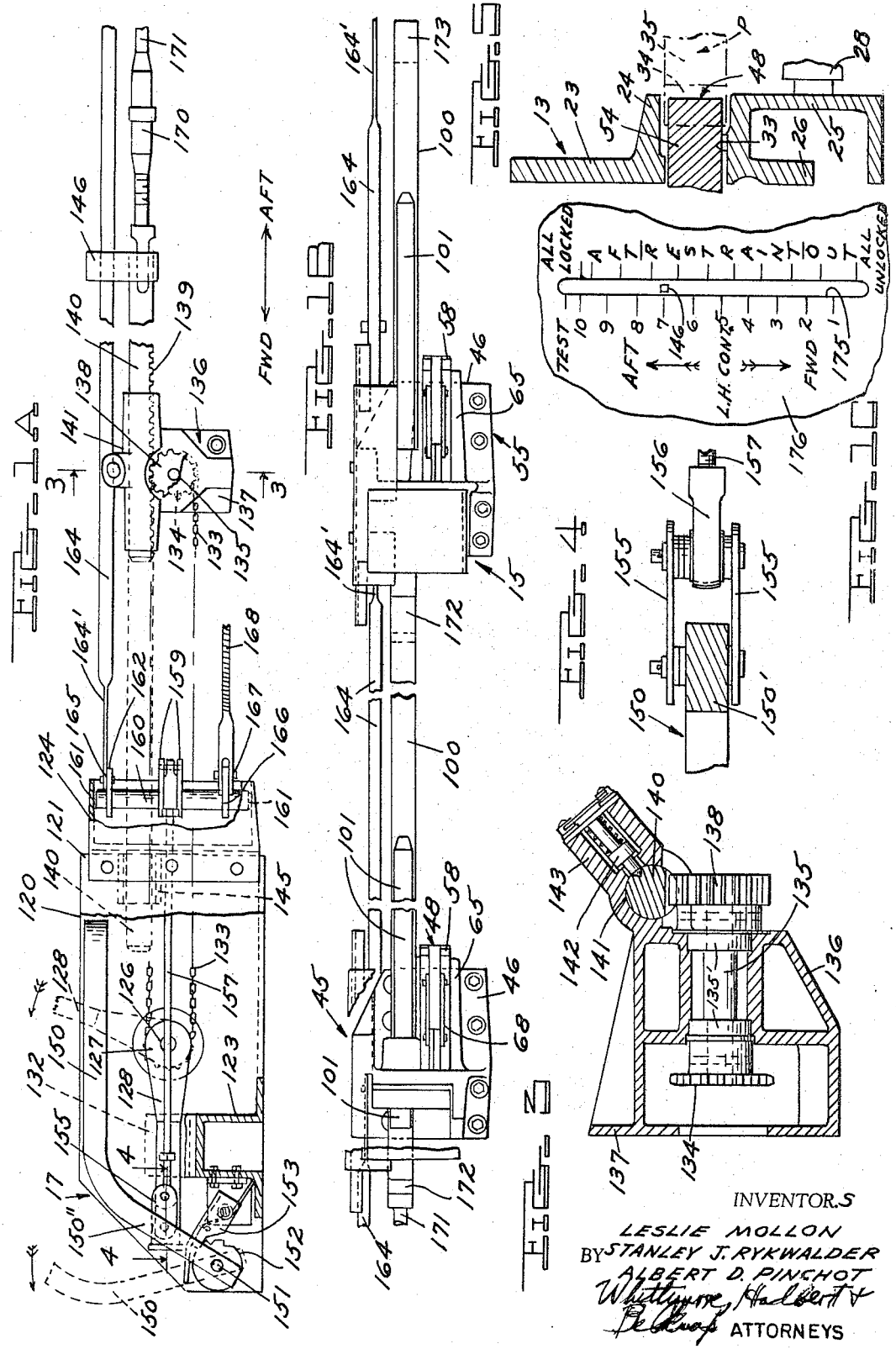

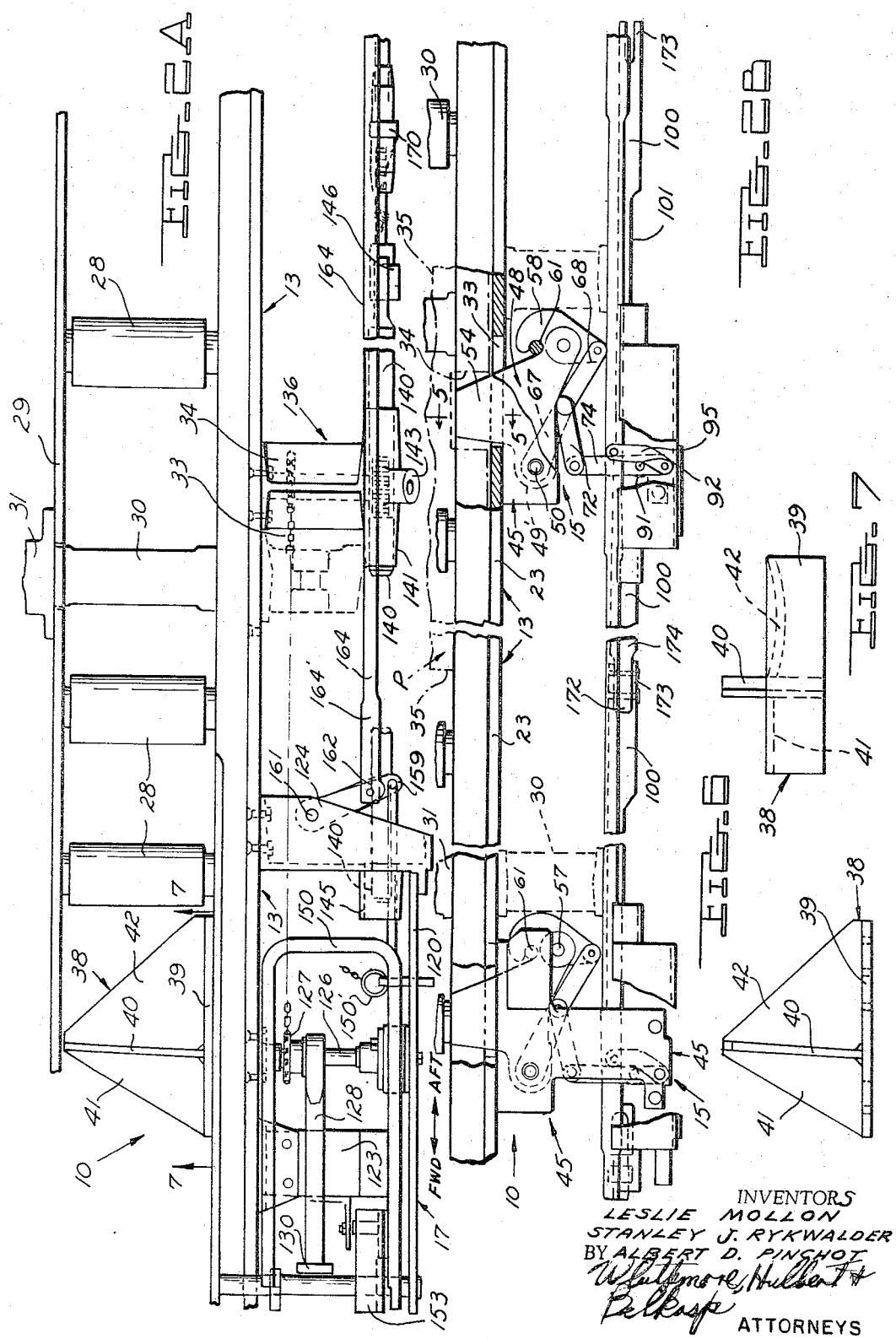

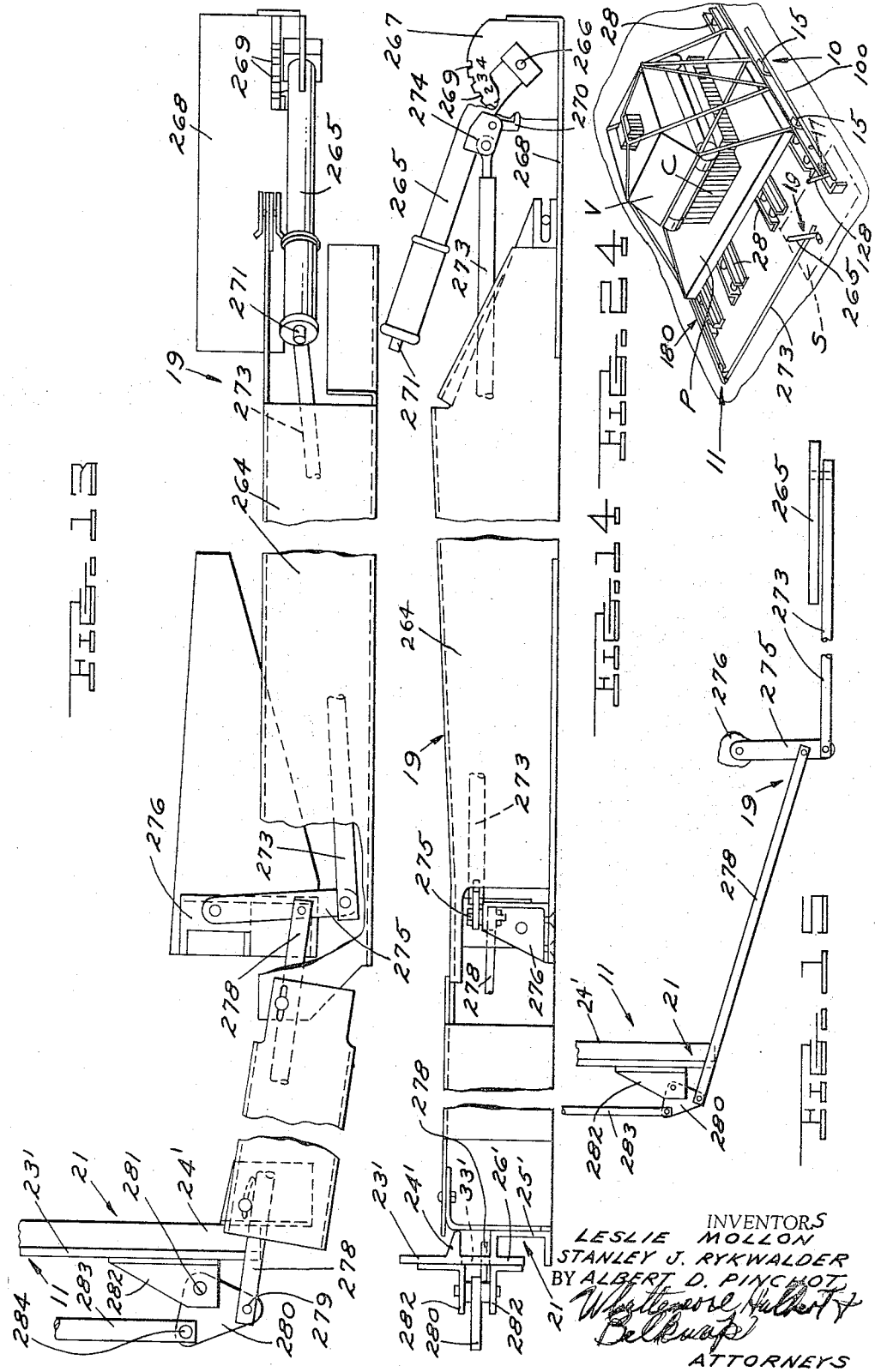

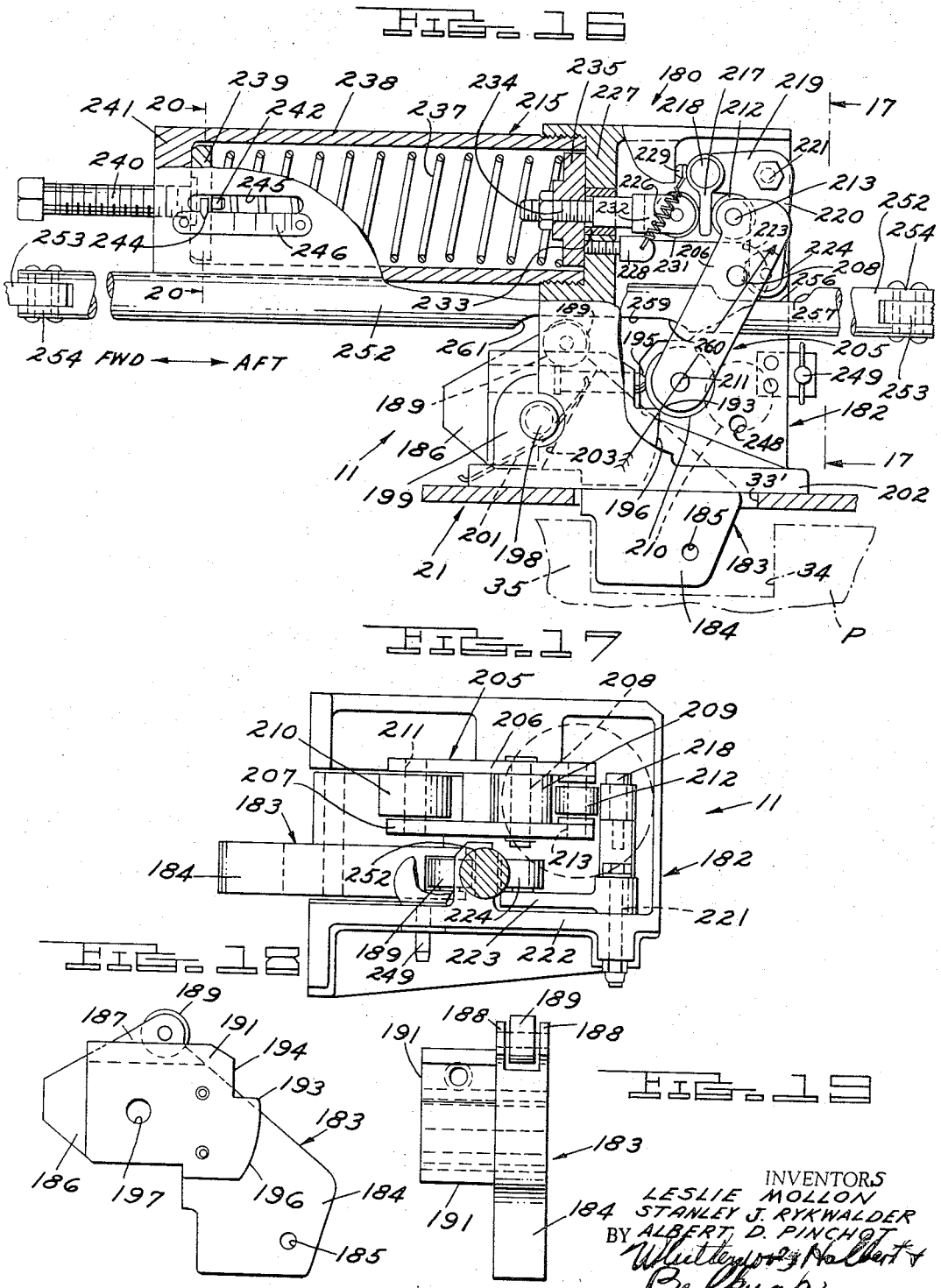

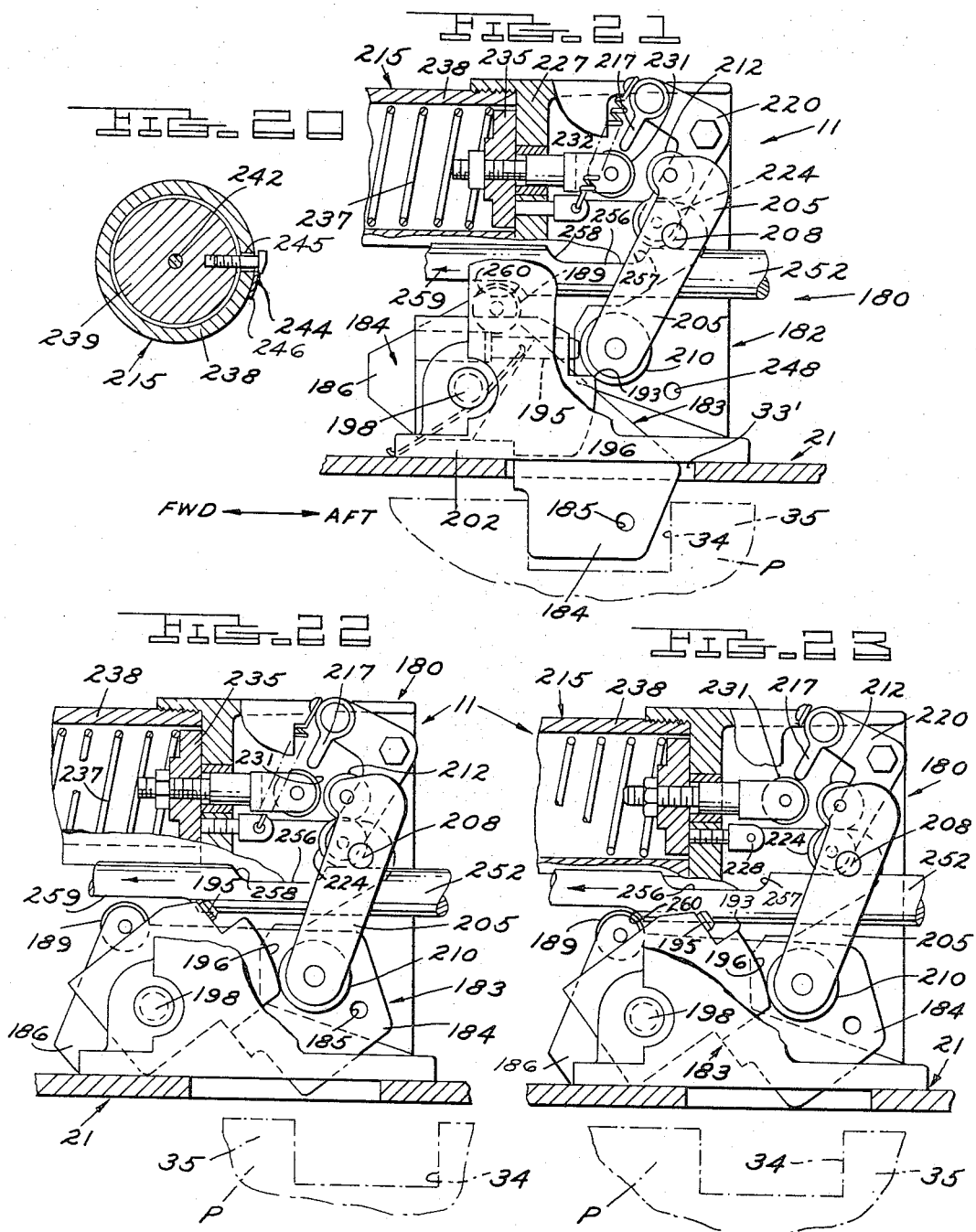

United States Patent Office 3,335,983
Patented Aug. 15, 1967

3,335,983
AIRCRAFT CARGO LOADING SYSTEM
AND COMPONENTS
Leslie Mollon, Detroit, Stanley J. Rykwalder, River Rouge, and Albert D. Pinchot, Livonia, Mich., assignors to Brooks & Perkins, Inc., Detroit, Mich., a corporation of Delaware
Filed May 21, 1963, Ser. No. 282,008
38 Claims. (Cl. 244—137)

The present invention relates to an improved aircraft cargo loading system and components thereof. More particularly, the invention concerns a logistical ground loading and unloading installation for military cargo aircraft, which also incorporates coordinated means for the in-flight air delivery of military material, under drag of a small extraction parachute or parachutes, followed by the dropping of such material to the ground by one or more larger main parachutes. However, although specifically devised for installation in an air force cargo plane, it is evident that the system and components of the invention are also suited for a commercial installation, particularly in regard to its ground loading and unloading features.

It is a general object of the invention to provide a cargo handling system and components for the above purposes which conforms in all respects to exacting governmental specifications. Among the most important of these, although not necessarily in their degree of importance, are the following:

All parts of the system must be of the most simple and lightweight construction consistent with needed strength and reliability of operation, and must meet a five year service life requirement. They must also be capable of simple and rapid installation in the cargo space of the aircraft, being located for ample and rapid access for inspection or servicing. The system must embody restraining rails capable of acting on load-supporting pallets or platforms of a standard design, in a manner to afford vertical as well as side horizontal restraint of such pallets and their loads as will result in a stably installed cargo.

The locking mechanisms of the system, as installed in spaced positions longitudinally along the right and left hand restraining rails, must themselves afford a specified positive forward and aft restraint of the pallets engaged thereby, yet be readily and easily released from this condition by manual manipulation of emergency control means. In addition, the locks of one of the rails must be such as to permit automatic extraction parachute release for release of the load pallets under parachute drag force of a predetermined value. At the same time, the components of the system must be capable of optional manual control within the cargo compartment permitting a shifting of loads to trim the plane, if desired.

Further, the installation must be such as to be proof against deterioration, jamming of operating components, reliable under all foreseeable atmospheric conditions, etc.; and it must be standardized to the maximum possible extent; its components should be operable using standard hand tools, etc.

It is a further object of the invention to provide an aircraft cargo handling system for ground logistical loading and unloading of load pallets, or for air parachute delivery in flight which satisfies the foregoing exacting specifications.

More specifically, it is an object of the invention to provide a system of this sort which incorporates parallel left-hand and right-hand restraining rail structures or assemblies, each provided with its own longitudinally spaced series of restraining locks which coact with the respective rails in affording the desired vertical, lateral and forward and aft restraint of the pallets.

In accordance with the invention, one of these rail structures or assemblies, for example the left-hand, is operated by manipulation on the part of the loadmaster, from a forward position of the cargo compartment, to optionally lock and unlock the successive locks of this rail in a sequential fashion. In this, the operation of the master control is such as to unlock and release the lock mechanisms in sequence from aft to forward, and to lock the mechanisms sequentially in the direction from forward to aft.

A specific improvement in regard to the last named locking action resides in the provision of means on each left-hand lock to insure that it must be in a locked condition before the lock immediately to the aft thereof can be locked. Thus there is provided a fool-proof means to make sure that no pallet will be left in anything other than a fore and aft restrained condition during the sequential master phase of loading and locking referred to above.

Still further in accordance with the invention, the master left-hand control mentioned above incorporates means for the emergency or standby locking or unlocking of all left-hand locks simultaneously, should conditions of ground loading or unloading of the cargo, or of parachute air delivery, indicate. The emergency control structure is built into the master control directly adjacent the sequential lock control feature, so as to be conveniently accessible to the loadmaster for instantaneous operation of either. In this connection, the control features are such as to be capable of operation by a relatively slight physical effort, and are positioned and held in a manner to prevent accidental actuation.

In further accordance with the invention, the emergency and sequential operating control means for the left-hand restraint rail locks are coordinated at a forward master control station with a master control for the opposite or right-hand rail and lock structure or assembly. Thus, the loadmaster seated at this forward station has instantaneous and convenient access to both the right-hand and the left-hand master controls in governing the loading and unloading procedure.

The right-hand restraint rail assembly is identical in regard to its restraint rail, per se, to the left-hand. However, the right-hand lock mechanisms, in a number corresponding to the number of left-hand mechanisms, are specifically different from the latter, since they perform a function of permitting the extraction parachute release of the pallets under parachute drag exceeding a predetermined force imposed by the right-hand locks.

Thus, in accordance with the invention, while the lock detents or dogs of the left-hand restraint rail assembly are operated from the left-hand master control through the agency of individual overcenter toggle linkages setting up the positive fore and aft restraint referred to above, the lock detents of the right-hand rail structure are, when in condition for parachute delivery, held impositively (although under heavy spring force) in locking engagement with their side of the pallets. Specifically, this is accomplished by engagement with an abutment shoulder on the detent, of an operating arm which is effectively held in detent restraining position by means of an adjustably loaded restraining spring unit, the force of which is calibrated to maintain the operating arm against yielding to release the detent until parachute drag force exceeds the adjustably rated force of the spring unit, whereupon the pallet is parachute-extracted.

It will, of course, be understood that this takes place only when the right-hand locks are set from the right-hand master control for parachute extraction; and usually only after the corresponding left-hand lock or locks for the pallet in question have been conditioned for release or unlocking.

In accordance with the invention, the right-hand master control is such as to be capable of operation by the loadmaster for simultaneous emergency or standby unlocking or locking of all right-hand locks. This is accomplished by means which, in the emergency phase, first disables the parachute-responsive, abutment-carrying operating arm from opposition to its movement by the restraint spring unit referred to above.

The result is that all right-hand locks have their detents simultaneously freed for swinging to an inoperative, unlocked position, against only the force of small individual detent springs. Further manipulation of the right-hand master control optionally either locks these detents in a locked or an unlocked condition, in both cases in a positive fashion, so that in locked position of the detents the pallets are subject to positive forward and aft variable restraint. This is accomplished by positively holding the detent by means of an operating or control rod actuable from the master control.

Specifically, upon unidirectional manipulation of the right-hand master control the right-hand locks may be simultaneously released from a positively held unlocked condition to a normal condition for parachute extraction; then to a condition in which the locks are swingable, without restraint spring unit opposition, for manual actuation of any lock, if desired; and finally to a condition in which all right-hand locks are in locked position, with positive forward and aft variable restraint exerted thereon.

The invention also contemplates further specific improvements which are nevertheless of substantial significance and value. Thus, the system incorporates several parallel series of suitably supported conveyor load rollers upon which the load pallets, as laterally and vertically restrained by the rails, are rolled into or out of loading position in the cargo compartment; and this conveyor structure is designed for maximum lightness in weight consistent with strength and reliability, for compactness and ease of installation, and the like.

Further, improved forward bumper means to receive load impact shock are provided at the forward end of each of the left and right hand restraint rails. The improvement in this respect resides in the highly simplified construction of the impact stops or bumpers, notwithstanding their high degree of impact force resistance. Specifically, each is constructed as a weldment including a mildly curved, generally horizontal plate element welded to an upright stop plate engaged by the pallet, so that the curved plate tends to straighten instantaneously a very small amount when the stop plate receives the shock, and thus cushion against the latter.

Another improvement in accordance with the invention resides in the provision of manually manipulable lockout pins, one for each lock of one or both of the right and left hand sides, which can be positioned in a manner to provide positive lock-out of any desired lock; for the purpose of inspection, servicing or the like.

Still further in accordance with the invention, the master control of the left-hand rail is provided with a visual calibrated indicator device, by reference to which the loadmaster can instantaneously determine the condition of the locks of the left-hand rail assembly. Moreover, the individual locks of the right-hand mechanism each has its spring restraint unit equipped with a spring force adjusting member and a calibrated scale to assist in adjusting spring compression to the desired value to oppose extraction parachute drag in air delivery.

FIGS. 1A and 1B are complementary and longitudinally sequential side elevational views, partially broken away, of a left-hand restraint assembly of the system of the invention, rail structure having been omitted for simplicity in these figures;

FIG. 1C is a fragmentary top plan view showing an indicator arrangement to visually advise the loadmaster regarding the condition of the left-hand rail locks;

FIGS. 2A and 2B are complementary and longitudinally sequential top plan views, partially broken away, of the same left-hand rail installation, FIG. 2B being partially in horizontal section, these views generally indicating the relationship of the locking mechanisms to the left-hand restraint rail;

FIG. 3 is an enlarged scale view in transverse vertical section along line 3—3 of FIG. 1A, illustrating a sprocket and rack pinion type of operating device for a drive rod for the sequential locking or unlocking of the lock mechanisms of the left-hand rail;

FIG. 4 is a fragmentary enlarged scale view in horizontal section on line 4—4 of FIG. 1A, showing a detail of an operating connection of an emergency control for the left-hand rail locks;

FIG. 5 is an enlarged scale view in transverse vertical section on line 5—5 of FIG. 2B, illustrating a typical cross-sectional outline of the left-hand and right-hand restraining rails, and showing how locking detents or dogs act through openings in the rails to releasably restrain the load pallets;

FIG. 6 is a top plan view of an improved forward bumper such as acts at the forward end of each rail to provide an anti-shock stop for the load pallet, this bumper also appearing at the upper left-hand corner of FIG. 2A;

FIG. 7 is a side elevational view of the stop bumper, as viewed from line 7—7 of FIG. 2A;

FIG. 8 is a fragmentary top plan view, partially broken away and in horizontal section, of an individual locking mechanism of the left-hand rail, showing operative connections thereto of parts responsive to the sequential and emergency controls of the left-hand rail, this figure showing the parts in position to lock the pallet restraining detent of the mechanism;

FIG. 9 is a fragmentary top plan view generally similar to FIG. 8, but horizontally sectioned, this view showing the parts of the mechanism in an unlocking position;

FIG. 10 is an end elevational view of the left-hand locking mechanism, locking aft of the aircraft;

FIG. 11 is a side elevational view of the mechanism, looking inboard of the left-hand rail;

FIG. 12 is an enlarged scale view in vertical section along line 12—12 of FIG. 5, showing a control feature preventing the locking of any given left-hand rail mechanism unless the corresponding mechanism directly forward of the craft from the same is locked;

FIG. 13 is a fragmentary top plan view, partially broken away, of a master emergency lock and unlock control for the lock mechanisms of the right-hand rail of the installation, this control being coordinated with the sequential and emergency control for the left-hand rail at the control station appearing in FIGS. 1A and 2A;

FIG. 14 is an end elevational view, looking aft and being partially broken away, of the control of FIG. 13;

FIG. 15 is a fragmentary schematic view in top plan showing the general arrangement of parts of the control of FIGS. 13 and 14 in relation to the right-hand restraint rail of the system;

FIG. 16 is a top plan view, partially broken away and in horizontal section showing features of one of the individual lock mechanisms of the right-hand rail by which its detent is optionally operated against spring force and under extraction parachute drag on a load pallet, or from the emergency control of FIGS. 13, 14 and 15, the parts being shown in position for parachute unloading;

FIG. 17 is an end elevational view, looking forward of the craft, of the mechanism of FIG. 11, as from line 17—17 of FIG. 16;

FIG. 18 is a top plan view of the locking detent member or dog of the right-hand locking mechanism of FIG. 16;

FIG. 19 is an end elevational view of the detent of FIG. 18;

FIG. 20 is a view in transverse vertical section on line 20—20 of FIG. 16, showing an indicator used in the setting of spring compression of the extraction parachute-responsive mechanism of FIG. 16;

FIGS. 21, 22 and 23 are views similar to FIG. 16, but showing the manner in which a right-hand restraining lock mechanism is operated under emergency or stand-by control from the master control of FIGS. 13, 14 and 15; and FIG. 24 is a perspective view very schematically illustrating a portion of a typical installation of the cargo handling system of the invention in a military cargo aircraft, with a typical pallet-supported army vehicle locked in place by the locking mechanisms of the system, the figure also schematically showing a master sequencing and emergency lock and release control station from which the operation of the locking mechanisms of both the left and right hand restraint rails is coordinated.

General installation

As generally illustrated in FIGS. 1A, 1B, 2A, 2B, 13 and 14, particularly as coordinated in the highly schematic view of FIG. 24, an aircraft cargo handling system in accordance with the invention is shown as comprising a left-hand rail and locking mechanism assembly, generally designated 10, and a right-hand rail and lock mechanism assembly, generally designated 11. It is to be understood that references in the specification to follow to "left-hand" and "right-hand" are in the sense of the left and right of a pilot in operating the aircraft; and without regard to how any components of any mechanism may actually be oriented in any figure, left-handwise or right-handwise. If any such latter distinction is intended, it will be specifically spelled out.

Left-hand rail assembly 10 is in general constituted by a longitudinally extending rail structure 13 extending substantially the entire length of the cargo interior of the craft, but installed so as not to interfere with existing access openings of the latter. This rail structure supports, at longitudinally spaced intervals along its overall length, a plurality of like detent lock mechanisms, each generally designated 15, by which load-bearing pallets P are releasably held in place. The mechanisms 15 are, for example, ten in number for a typical installation in a C-130 type military aircraft; and they are adapted to be sequentially unlocked, commencing with the aft-most mechanism and working forwardly to release pallets from fore and aft restraint, or to be sequentially locked, commencing with the forward-most mechanism and working aft; or they may be all simultaneously unlocked or simultaneously locked, should this be desired, whether in normal logistical cargo handling on the ground or for cargo discharge in flight. These operations are performed under the control of a loadmaster seated at the forward control station S; and in so far as the left-hand restraint rail 13 is concerned, they involve the manipulation by the loadmaster of a master sequential and emergency control device, generally designated by the reference numeral 17, features of which will, along with those of the lock mechanisms 15, be hereinafter described in detail. Any individual lock mechanism 15 at any position in the series of ten may also be manually unlocked or locked independently of the control 17.

In so far as the extraction parachute-responsive and emergency control of the opposite, right-hand locking mechanisms (to be described) is concerned, the setting of these is accomplished by the loadmaster in manipulating a second master control device, generally designated 19 in FIGS. 13–15 and 24. Manually operated means of this master device are also located at the loadmaster's station S, and will be hereinafter described in detail.

Rail structure

FIG. 5 of the drawings, which should be considered in conjunction with FIGS. 2A and 2B, shows the cross sectional outline of the elongated left-hand restraining rail 13; and it should be understood that the opposite right-hand rail, to be described (and generally designated 21 in FIGS. 13 through 23 relating to the right-hand restraining means), is similar in structure to the rail 13, although its position is of course reversed from that of the left-hand rail shown in FIG. 5.

Rail 13 is formed to provide an upright upper restraining portion or web 23, by which the load pallet is laterally restrained in the horizontal sense as it rides along conveyor idler rolls to be described; a laterally inwardly projecting flange 24 for vertical restraint of the pallet, which flange is located substantially beneath the top of web 23; and an integral lower, box-like sectional portion 25, at which the rail 13 is bolted or otherwise secured to the cargo floor or deck (not shown). The box-like portion 25 includes an integral outer depending flange 26 which, along with the remaining upright rail structure including the web 23, affords means for attaching the locking mechanisms 15, as well as the sequential and emergency release control device 17, to rail 13.

For simplicity, similar corresponding structural features of the right-hand restraint rail 21 are designated by corresponding reference numerals, primed, and further reference thereto will not be necessary.

A series of antifriction idler conveyor load supporting rollers 28 (FIGS. 2A and 2B), as journaled in longitudinally spaced, parallel relation to one another by the rail 13 and an auxiliary deck-supported frame structure 29, extend laterally from the inner side of the box portion 25 of rail 13; and a similar series of idler load rollers (not shown) are disposed in parallelism with and at the level of the rollers 28 in the space adjoining the opposite right-hand rail 21, where a supporting framework for these right side rollers is mounted to the rail 21 in the same manner. These roller units are braced and jointed together by cross members 30, 31 in a manner not germane to the invention (although as indicated above exacting government specifications apply to the roller arrangement, as well as to the various control and locking mechanisms and other components on both left and right hand sides). The vertical level of the load rollers is such that the tops of pallets rolled thereon are above the top of the restraint web 23 of rail structure 13.

Referring again to FIG. 5 in conjunction with FIG. 2B, the left-hand rail 13 is provided at spaced intervals therealong wtih longitudinally elongated slots 33 opening therethrough in the space between the pallet-restraining flange 24 and the bottom mounting section 25. It is through these slots 33 that a portion of the detent member (to be described) of each of the locking mechanisms 15 project, to be received in a recess or indent 34 in a side flange 35 of the load supporting pallet P; and with the projecting detent member locked rigidly against movement from its projecting position, positive fore and aft restraint of the pallets results. There will be one or more of the left-hand locking mechanisms 15 for each load supporting pallet, hence a corresponding number of the slots 33 along the restraining rail 13.

Shock absorbing bumpers

As indicated above, the invention contemplates an improved and highly simple means for absorbing impact shock of the forward-most load pallet as it rolls forward on the rollers 28, such means being in the form of the cushioning bumper or load stop 38 appearing in FIGS. 2A, 6 and 7. Of course, a similar stop (not shown) is applied to the right-hand restraining rail 21. It comprises an integral weldment of generally triangular outline in plan, including an upright side mounting flange 39 which is bolted, welded or otherwise rigidly secured to the inner side of the box portion 25 of the rail, projecting inwardly thereof. An upright stop plate 40 is welded to the inner surface of flange 39, extending horizontally therefrom at a very slight angle in the aft direction. Plate 40 projects substantially above the top of the flange 39 for impact engagement by load pellets traveling to the fore on load rolls 28.

A pair of bracing plate members 41 and 42, both of triangular outline in plan, respectively extend forwardly and to the rear of stop plate 40, to which each member is welded along its adjacent edge, as well as to flange 39. The forward plate 41 is flat and horizontally disposed, as appears in FIG. 7; and bridges stop plate 40 and mounting flange 39 in the manner of a rigid strut adjacent the top of the flange. However, the aft plate 42 is of mildly upwardly concave outline (see FIG. 7).

The purpose of this is to permit some straightening of the curved plate member 42, as the upright stop plate 40 is struck from the rear by a loaded pallet load, amounting (per design specification) to as much as 35,000 pounds in weight traveling at as much as 1.66 feet per second. However, this kind of performance is well within the capability of bumper stops 38 constructed and mounted as shown in FIGS. 2A, 6 and 7. The impact momentum tends, as indicated, to instantaneously straighten the curved plate member 42 and cushion the shock, the member then instantaneously returning to its curved outline of FIG. 7.

Bearing in mind that ability to cushion extremely heavy momentum shock must be coupled, in an aircraft installation, with lightness in weight, economy of space, simplicity of design, ease and speed of assembly, and other practical factors, it is seen that the bumper stops 38 constitute a significant, though simple, factor of the invention.

*Left-hand restraint rail assembly and locks*

It is in order next to consider the structural features of the individual left-hand rail locking mechanisms 15, as mounted to the outboard side of the restraining rail 13 (see FIG. 2B taken in conjunction with FIGS. 8 through 12); and then to consider the master left-hand sequential and emergency control 17 and its connections to the mechanisms 15 to operate the same in several optional manners.

Each mechanism comprises a cast housing or body 45 having an upright, longitudinaly extending flange 46 at which the housing is bolted to the outer side of lefthand rail 13, as at the restraining web 23 and flange 26 of the latter; and the positioning of the housing in the vertical and longitudinal senses is such as to permit operation of the locking detent of mechanism 15 in the rail slot or opening 33.

Such locking detent is generally designated by the reference numeral 48, structural features thereof being best shown in FIGS. 2B, 8 and 9 of the drawings. It comprises a pivoting tail portion 49 which is forked and apertured through its fork furcations 49' (FIG. 10) to pivot together with a stem or shaft 50 keyed to the lower furcation 49' and extending vertically through integral; upper and lower boss and cross parts 51, 52, respectively, of the housing casting 45. The detent 48 is provided with an integral outer locking nose 54 of substantial thickness, and this is the part of the detent which in operative position extends through the rail slot or opening 33 for reception in a side indent, notch or recess 34 of load pallet flange 35.

Detent 48 is completed by an end ear 55 which has a hole 56 therein receiving a pin 57 by which a detent lock member 58 of hooked shape at 59 is pivoted on detent ear 55. The hooked portion 59 is adapted for releasable locking engagement with an anchor pin 61; and the latter is releasably engageable vertically in vertically aligned holes 62, 63 through integral flange members 64, 65 of the housing casting 45, the lowermost of which flange members is an integral longitudinal extension of the housing cross part 52. The anchor pin 61 may be manually withdrawn from holes 62, 63 should it be desired to release any given detent from locking position without resort to the sequential and emergency release means of the left-hand master control 17. The detent 48 may then be positively locked-out manually by reinserting the pin 61 through a hole 66 in detent nose 54 and further vertically aligned holes 66' in housing flanges 64, 65.

The hooked detent lock member 58 is swingable clockwise about its pivot on pin 57 from its operative holding position of FIG. 8, in which further outward movement toward the pallet recess 34 is limited by engagement of the detent ear 55 with another pin 61, to a retracted position in which it will clear releasable anchor pin 61, hence will in turn permit detent 48 to swing clockwise with the shaft or stem 50 to the retracted or unlocked, inoperative position of FIG. 9. Such release is effected by operation of an overcenter toggle linkage, which also serves in its operative, overcenter position of FIG. 8 to lock the locking hook 58 in place, and thereby enable the detent to provide positive fore and aft restraint for the pallet P.

The linkage comprises a horizontal arm 67 which rotates on the detent pivoting stem or shaft 50 between the furcations 49' of the pivot tail 49 of detent member 48; a pair of upper and lower horizontal connecting links 68 pivoted by a toggle pin 69 to the outer end of arm 67, the ends of these links in turn being pin-pivoted at 70 to a tail portion 71 of the detent lock member 58; a tension link 72 pivotally connected to the pin 69 by which the arm 67 and links 68 are connected as a toggle; and a form of bell crank 74, to a longer bottom arm 75 of which the tension link 72 is pivotally connected by means of a pin 76.

A torsion spring 78 (FIGS. 8, 9 and 11) is coiled about the toggle pivot pin 69, acting at one end against a small abutment stud 79 extending between the upper and lower links 68, and at its opposite end abutting an offset 80 of the arm 67. Spring 78 has the effect of urging the pin 69, hence locking the toggle constituted by arm 67 and links 68, past a dead center position (FIG. 8) to the left of a theoretical line through the axes of shaft or stem 50 and the pin 70. In this position the left-hand side (FIG. 8) of the arm 67 abuts an upright relieved surface 58' of the locking member 48 which extends from between the furcations 49', thus to limit further movement of the arm and link parts 67 and 68 past the locking position of FIG. 8. As indicated above, the detent locking member 58 is thus held braced in its operative locking position of FIG. 8, providing in coaction with the releasable anchor pin 61 a restraint for the detent 48 by which it is positively prevented from swinging either direction about its pivot at stem or shaft 50. The sole function of the torsion spring 78 is to maintain the toggle link pivot 69 to the left (FIG. 8) of a theoretical line through the link end pivots at 50 and 70, with the side of arm 67 abutting the surface 58'. Spring 78 exerts no force capable of disengaging the locking member 58 from the pin 61.

The anchor or detent locking pin 61, whether engaged in or removed from the holes 62, 63, is kept from being lost (as well as being more readily manipulated) by being provided with a finger ring 82 which is connected by a chain 83 to an anchor screw 84 at the top of housing casting 45.

The bell crank 74 of the toggle control linkage, as further comprised of the above-mentioned arm 67, connecting links 68 and tension link 72, is provided at its end opposite its pivot pin 76 with an enlarged boss 86 (see FIG. 10) at which the bell crank is pivotally connected on an upright axis to the housing 45, as by means of an elongated pivot pin 87 extending at its top through an integral top, transversely projecting flange 88 of the housing and at its bottom through the outer end of the lower integral cross part 52 of the housing 45. Medially of the vertical dimension of boss 86 of bell crank 74, this boss is recessed at 90 to receive a follower roller 91 journaled on a fixed upright stud 92 extending through the boss 86.

Thus the follower 91 is in effect journaled on a bell crank arm 93 shorter than the bell crank arm 76 and in a common plane with the latter. As best shown in FIG. 10, the roller journaling stud 92 projects upwardly above the top of bell crank 74, where it is adapted to be engaged by an emergency operating arm 95 of angled outline, which is pivoted on the bell crank pivot pin 87 directly above bell crank 74.

As will appear, the operating arms 95 of the several left-hand lock mechanisms 15 are adapted to be simultaneously actuated from master control 17 for emergency unlocking or locking of their detents 48 through the agency of elongated connector means (to be described), which means has similar operating connections to the several operating arms 95 at holes 96 (FIG. 8) adajacent the free ends of such arms.

A second small torsion spring 98 is coiled to surround the detent pivoting stem or shaft 50 (between the furcations 49′ of detent 48 and directly above the arm 67 on stem 50). This spring 98 at one end abuts the upright flange member 46 of housing 45, and at its other end engages the body of detent 48 in a way to urge the latter counterclockwise (FIGS. 8 and 9) about pivot stem 50.

Thus, one torsion spring 78 tends to maintain the toggle linkage in its overcenter, operative locking position, and the other torsion spring 98 tends to urge the detent 48 towards its operative pallet locking position of FIG. 8. However, when the toggle is broken and the hooked detent lock member 58 is released, the force exerted by the pallet P in the aft direction is ample to swing detent 48 outwardly to its inoperative, released position of FIG. 9. Yet the spring 98 is sufficiently strong to return detent 48 inwardly in the absence of opposing force; just as the spring 78 is capable of restoring the toggle linkage, once the locking hook 58 reengages anchor pin 61.

Each locking mechanism 15 is operated for its locking or unlocking action, respectively in sequence with other like mechanisms in unlocking from aft to forward and in locking from forward to aft, by means of its own sectional length 100 of a sequential longitudinal operating rod connection which, like the operating connection for the sequential and emergency operating arms 95, is controlled from the sequential and emergency control device 17 of FIGS. 1A and 2A. As indicated above, further specific reference will be made to these connections and to the device.

Each rod section 100 is of solid cylindrical section at its locking mechanism 15 and is provided on one longitudinal side thereof with a recess 101 of substantial radial depth and some longitudinal extent. Each recess is flat surfaced along its length, being defined at its aft end by a 45° inclined operating wedge surface 102 adapted to cammingly engage the follower roller 91 of the bell crank 74 of the toggle linkage described above, when rod section 100 is moved to the forward in the direction shown in FIG. 8. This will swing the bell crank 74 counterclockwise about its pivot at 87, and thereby break the linkage toggle, so that detent lock member 58 may disengage anchor pin 61, and, with detent 48, swing to the inoperative position shown in FIG. 9 of the drawings.

Each flattened recess 101 is defined at its end opposite from the cam wedge 102 by an abrupt radial stop surface 103, and a small weldment 104 on rod section 100 provides an outer continuation of this abrupt surface. This is for the purpose of positively resetting the toggle linkage, on a reverse stroke of rod section 100, to its operative position of FIG. 8, with the detent 48 in the position of that figure, and of preventing a possible overdun of the follower roller 91 onto rod section 100 on the reverse stroke.

The anxial length of the several rod recesses 101 decreases sequentially in the longitudinal direction of the respective rod sections 100 from forward to aft. Thus, when the sequential control means of control device 17 (to be described) is operated in an indexing, ratcheting fashion, the motion of the sections 100 being forward (or toward the pilot's seat) for sequential unlocking of the several mechanisms 15, the cam wedge surface 102 of the shortest flat 101 of the aftmost rod section 100 will, upon the first indexing motion of the sequencing means of master control 17, engage its bell crank follower 91, to break the toggle linkage and release the load pallet at the aftmost mechanism 15 of the left-hand rail.

Similar sequential indexings will cause progressively longer recesses 101 of the respective rod sections 100 to sequentially engage their wedge surfaces 102 with followers 91 of their bell cranks 74, the followers successively riding outwardly from surfaces 102 onto the circumference of the rod section, until the sequential releasing is completed at the forwardmost restraint locking mechanism 15.

By the same token, upon a reverse setting of the sequential operator of control 17 for locking action, as will be described, the respective abutment surfaces 103 will sequentially, in the reverse direction, engage the bell crank follower rollers 91 to restore the mechanisms to the locked condition of FIG. 8 by overcenter restoring of the toggle linkages thereof. That is, the surface 103 of the aftmost will last engage its bell crank follower 91 to straighten the linkage at arm 67 and links 68.

It is important that no one of the locking mechanisms 15 shall be placed in a locked condition until the mechanism directly forward thereof or towed the load-master and pilot) is locked, so that the intended progression of locking from forward to aft is insured. To this end, the detent pivot stem 50, to which the tetent 40 is secured, is provided with an integral enlarged cylindrical head 106 directly above the housing boss 51, upon which formation the head 106 rests.

The head 106, as shown in FIG. 8, is provided with a V-cleft 107 on one radial side thereof, which is adapted to receive, when the lock mechanism 15 in question is locked, the end of a flanged security pin or plunger 108. The flange 109 of pin 108 is (FIG. 12) guided in a small housing part 110 of housing 45 proper. A coil compression spring 111 acts in an annular space of this housing adjacent the pin or plunger flange 109 to urge the security plunger pin 108 towards the left, as viewed in FIGS. 8 and 12, and into the V-cleft 107 of stem head 106. The pin or plunger 108 is pin-secured to a cylindrical member 112 slidable in the bore of housing part 110, the member 112 itself having two coaxial bore diameters. The smaller and right-hand of these (FIG. 12) is used to guide a headed pin 113, urged to the right by coil compression spring 115, and the larger is used to contain spring 115 and the head of pin 113. Thus, any force applied to the right on pin 108 drives pin 113 to the right also and causes said pin to project laterally to the right out of housing part 110 and through an opening in an integral arcuate rod guide 114 of housing 45.

On its side opposite its flattened recess 101, each rod section 100 is formed to provide an elongated, keyway-type groove 116, into which the adjacent end of pin 113 is adapted to project. However, it is not projected into the groove 116 unless the detent 48 is swung out of its position of FIG. 8, thus causing the V-cleft 107 of the head 106 of stem 50 to cam the pin to the right, as viewed in FIGS. 8, 10 and 12.

This reflects a condition in which the hooked detent lock member 58 of the mechanism 15 in question is not fully engaged in its operative position of FIG. 8. In this case, with the pin 113 projected into slot 116, it will be engaged by an abrupt radial forward end 116′ of the groove 116 of the rod section 100, and therefore will prevent the rearward transmission of force by that particular rod section to the next aftmost corresponding rod section. It follows that the next aftmost mechanism 15 cannot receive locking actuation through the articulated rod connection, to be described. No after mechanism 15 may be locked until the immediately forward mechanism 15 has been locked; otherwise it will be in order to make an immediate inspection to ascertain why the more forward mechanism 15 has become "hung up."

Like the cam or wedge recesses 101 on the opposite side of the rods 100, the length of the slots 116 of the respective rods increases sequentially from aft to forward to accommodate successive lockings and unlockings of the detents. The slot ends 116' have no effect in the unlocking action, since, as shown in FIG. 8, the direction of shift in that action is forward, pulling the slot ends 116' away from the zones of action of the pins 108.

*Left-hand master control*

Reference should now be made to FIGS. 1A and 2A, side elevational views, for structural features of the master, left-hand sequential and emergency control 17 and its operating connections to the rod sections 100 of the several locking mechanisms 15, and to the emergency operating arms 95 of those mechanisms. The parts of the device 17 are shown as mounted between upright walls 120 of a forward housing extension 121, which is in part supported and constituted by the left-hand restraining rail 13. A rigid cross bracket member 123 extends between the walls 120, and an aft housing bracket 124 also extends outwardly from rail 13 to support one of the walls 120. Minor details of other bracket structure of the control device 17 are omitted.

A transverse ratchet journal shaft 126 is sustained at its ends in the walls 120, as by means of bracket parts of the type just referred to; and the shaft 126 has a chain sprocket 127 secured thereon. A conventional type of two-way or reverse acting ratcheting lever or arm 128 is operatively connected to the shaft 126, acting in the well known manner of a reversible ratcheting wrench, so that counterclockwise indexing operation of the arm 128 from one position to another, as indicated respectively in dotted and solid line in FIG. 1A, and shown by the arrows, will result in rotation of the sprocket 127 accordingly.

Details of this sequential ratcheting means operative by stroking of the lever arm 128 have not been shown. It is very similar to a conventional reverse-acting hardware wrench and it is believed that its nature and operating connections to the shaft 126 will be familiar to those skilled in the art. Thus, in a conventional manner the arm 128 is provided at its outer end with a reversing control finger piece 130, by manipulation of which the ratchet connection may be reversed.

It is intended that, in one setting of the finger piece 130 for unlocking, a pull of arm 128 forwardly, or towards the left in the specific sense of FIGS. 1A and 2A will result in a rotation of the sprocket 127 in a counterclockwise direction (FIG. 1A) for the sequential unlocking of the several locking mechanisms 15, one for each stroke of the arm 128, through operating connections to the rod sections 100 which will be described; while with the finger piece 130 oppositely set 180°, a corresponding swing of arm 128 counterclockwise will reversely drive sprocket 127 for sequential locking of the mechanisms 15, one for each stroke of the arm. Arm 128 may be held in its lowered, inoperative position of FIG. 1A by means of a spring clip 132 carried by cross bracket 123.

An operating chain 133 is trained about sprocket 127, extending aft through a suitable opening or openings in the housing bracket 124 to entrainment about an aft sprocket 134 (FIGS. 1A, 2A and particularly FIG. 3) secured on a shaft 135 journaled in a housing bracket 136 having an upright flange 137, by which this bracket is bolted to the outboard side of the left-hand restraint rail 13. Details of the sprocket and housing structure just referred to are best shown in FIG. 3 of the drawings.

Specifically referring to FIG. 3, again in conjunction with FIGS. 1A and 2A, the horizontal sprocket shaft 135 is journaled by bearings or bushings 135' within housing 136. In addition to the sprocket 134, the shaft 135 has secured on its end opposite the sprocket a small pinion or gear 138. This pinion is upwardly in mesh with rack teeth 139 on the lower side of a rigid driving rod 140 that is guided for longitudinal sliding movement in an elongated tubular boss 141 integral with housing 136 (FIGS. 1A and 3). A spring urged alignment pin 142 slidably engaging a groove of rod 140 is received within an integral extension 143 of boss 141.

Thus, as the arrangement of sprockets 127 and 134 and shaft 133 causes reversing drive of the pinion 136, in accordance with the setting of sequential control arm 128, the driving rod 140 will be correspondingly driven sequentially in indexing increments towards the aft, for the sequential positive locking of the mechanisms 15, or in the forward direction, for a corresponding sequential unlocking of those mechanisms.

Drive rod 140 is shown in solid lines in FIGS. 1A and 2A in a fully aft position, and in dotted line in a fully forward condition, in which it will be seen that its end extends through an integral tubular, protective guide formation 145 of the housing bracket 124. The opposite or aft end of drive rod 140 has fixed thereon an indicator 146 (hereinafter described), by knowing the position of which the loadmaster may, at an instant's glance, ascertain the way in which the mechanisms 15 have been sequentially locked or unlocked, or simultaneously locked or unlocked. The scheme of actuation of these mechanisms will now be described.

Referring to FIGS. 1A and 2A, the reference numeral 150 designates a U- or bail-shaped operating lever arm for the control of the standby or emergency simultaneous locking or unlocking of the mechanisms 15. When not in use, lever 150 may be locked against accidental operation by a removable pin 150'.

The spread arms of this emergency lever 150 are secured to a forward transverse shaft 151 journaled in the upright side plates 120; and a toothed latch disc 152 is also secured to this shaft, the teeth thereof being engageable by a spring urged pawl finger 153 mounted on an angle piece carried by bracket 123. This enables lever 150 to be releasably held in a forward operated position, as shown in dotted line in FIG. 1A.

Upwardly of the shaft 151 the arms of the operating bail 150 are curved longitudinally rearwardly, and one of the arms, designated 150" (see FIG. 1A), is pivotally connected by a pair of tension links 155 with a connector 156, with which an elongated operating rod 157 has adjustable threaded engagement.

As best shown in FIG. 1A and 2A, the operating rod 157 extends aft through a suitable opening in the housing bracket 124, where it is connected in turn, in clevis fashion, with a double crank arm 159 secured fixedly to an upright shaft 160, which is appropriately journaled above and below in the bracket housing 124 at 161.

Above the dual crank 159, the shaft 160 carries a further crank arm 162 which, as shown in FIG. 2A, is aligned vertically above arm 159; and an elongated tubular operating rod 164 is pivotally connected at 165 to this upper crank arm, the tubular rod 164 being flattened at 164' for this connection.

There is a third crank arm 166 secured to the shaft 160 in vertical alignment beneath the double crank arm 159 and the arm 162; and the arm 166 has a clevis connection at 167 to a flexible cable 168. However, the flexible cable control from crank arm 166 is intended to be connected to another type of locking mechanism than the herein illustrated mechanism 15. As to the latter, operational specifications to which the present invention is directed forbid operation by other than rigid operating connections, i.e., rather than a flexible cable. Therefore, the crank arm 166 and cable 168 may be disregarded in so far as the present invention is concerned. They are shown simply to indicate the adaptability of the sequential and emergency control device 17 to the control of locking mechanisms specifically differing from these described above.

Rearwardly or aftward of its indicator 146, the sequential control drive rod 140 is connected by an adjustable, turnbuckle type connector 170 to a rod 171, which is in turn fixedly connected with the forwardmost rod section 100 (FIG. 8) of the series of such sections for the mechanisms 15, as at a forward forked end 172 of said rod section 100. The latter is connected (FIGS. 2B and 8) at its forked rear extremity 173 with a plain rod section 174, which in turn is connected to the forked end 172 of the rod section 100 of the next aft mechanism 15, and so on through similar rod means connecting the remaining eight mechanisms.

As for the operating connections for the emergency operating arms 95, they are made at flattened portions 164' (FIG. 1B) of the tubular rod 164.

The nature and function of the left-hand control indicator 146 appear in FIG. 1C of the drawings. As secured to the aft or right-hand most end (FIGS. 1A and 2A) of the toothed drive rod 140, it projects upwardly through a longitudinal slot 175 formed in a cover plate 176 for the left-hand rail structure 13 and locking mechanisms 15. The plate 176 has been omitted from the remainder of the drawings for the sake of simplicity. It may be sectioned lengthwise and pivoted to the rail 13 for access in inspection and/or servicing.

The left-hand side of the slot 175 is calibrated in terms of the number of lock mechanisms 15 of the installation, typically instanced at 10. These calibrations run rearwardly from forward to aft in the numerical sequence 1 to 10; and these calibrated stations are spaced from one another a distance corresponding to that through which the drive rod 140 moves upon each indexing phase of operation of the sequential control arm or lever 128, which is always counterclockwise about its pivot as indicated in FIG. 1A.

Thus, each time the indicator 146 shifts a full calibration space toward the bottom of FIG. 1C, as from the station number 8 to the number 7 (FIG. 1C) the loadmaster has a visual indication that the lock mechanism 15 third from the aftmost has been unlocked, those corresponding to the numbers 9 and 10 having first been unlocked. The indication when the finger control piece 130 of ratchet arm 128 is reversedly set is, of course, the opposite, indicating that the locks 15 are progressively locked from forward to aft.

The opposite or right-hand side of slot 175 is calibrated staggeredly of the numbered left-hand calibrations, so that when the indicator 146 reaches one of these intermediate calibrations, visual notice is given that the numerically calibrated station of the mechanism 15 to the aft thereof has been unlocked prior to unlocking the next forwardmost, or, conversely, that it remains unlocked and is to be locked upon the appropriate stroke of drive rod 140. Suitable further captions appearing in FIG. 1C make the condition of the installation visually apparent at all times.

It will be seen from the above that the lock mechanism 15 and control provisions 17 of FIGS. 1A–12 provide all of the required government specified actions as regards sequential and simultaneous lock and unlock of the left-hand restraining rail lock mechanisms 15. The same is true of the master control 19 and the mechanisms of the right-hand side, though in a specifically different fashion.

*Right-hand restraint rail assembly and locks*

Only one of the locks, generally designated 180, of the right-hand rail assembly 11 is shown in FIGS. 16–23 of the drawings, it being understood, however, that they are in a number corresponding to the left-hand locks 15, instanced as ten. They are emergency-operated or standby-operated under the control of the right-hand emergency control 19 appearing in FIGS. 13, 14, 15 and 24, which will be hereinafter described in detail. FIG. 24 affords a very schematic and general illustration of the overall system assembly of the left-hand rail 10, including its master control 17; the right-hand rail 11 and its master control 19; the general arrangement of load conveyor rollers 28, and a typical military tank or vehicle V supported on and secured to a pallet P riding the rollers, the pallet being afforded vertical and side restraint by the restraint webs and flanges of the respective rails 13 and 21.

Each right-hand lock 180 is mounted in a housing 182 which is bolted or otherwise suitably secured rigidly to the outer side of the rail 21, in the manner that the left-hand housings 45 are secured to the left-hand rail. The mount is, of course, in position for the detent of the lock 180 to project through a side wall slot 33' of rail 21.

The right-hand detent, per se, is generally designated 183 (its structure being shown in FIGS. 18 and 19). It includes a detent nose 184 having a small hole 185 therein for a positive lock-out purpose to be described; a stop projection 186; and a forked tail 187, between the furcations 188 on which an operating roller is journaled.

A rugged abutment member 191 is rigidly secured to a side of the body of the detent member 183 just described. The member 191 provides an abutment shoulder or corner 193 which is adjacent a further, approximately 90° stop surface 194; and an adjustable stop stud 195 (FIG. 16) is threaded into the abutment member 191 to coact with the shoulder 193, for a purpose to be described in reference to the operation of detent 183. Outwardly of shoulder 193, the member 191 is formed to provide a mildly rounded bearing surface 196.

The detent comprised of members 183, 191 is provided with a hole 197 through the two (FIG. 18) and a removable pivot pin 198 extends vertically through this hole and through vertically spaced integral ears 199 of housing 182, between which detent 183 is disposed, thus to pivot the detent 183 on the housing. A torsion spring 201 encircles pin 198, bearing at one end against rail 21 and at the other end against a shoulder 203 of detent 183, thus to urge the latter clockwise about pivot pin 198, as viewed in FIGS. 16 and 21–23. This urges the detent into its normal pallet locking position of FIG. 16.

*Right-hand lock—Aerial delivery*

As shown in FIGS. 16 and 17, a restraining arm 205 composed of a pair of spaced, parallel-superposed arm members 206, 207 is pivotally mounted by means of an upright pin 208 in straddling relation to an integral lug or boss 209 of the housing 182. An abutment roller 210 is journaled by a pin 211 between the arm members 206, 207 at one end of the latter; and a smaller force applying roller 212 is similarly journaled by a pin 213 between the arm members at their opposite end, the members having a slight forward offset at this roller pivot zone.

As shown in FIGS. 21 through 23, the abutment roller 210 normally rests against the abutment shoulder 193 of detent abutment member 191, also against the adjustable stop or abutment pin 195. The position of arm 205 is normally such that, as the pallet P exerts aftward force on the projecting detent nose 184, as under extraction parachute pull, the resultant line of force through detent abutment shoulder 193 is on a line slightly to the right (FIG. 16) of the pivot axis of arm 206 at 208. Accordingly, the force exerted on this small moment arm, tends to swing arm 206 counterclockwise about its pivot pin 208, as viewed in FIG. 16.

However, this force must attain a minimum value, as determined by the setting of a spring resistance unit 215, to be described, before the detent shoulder 193 may ride past the abutment roller 210, allowing the latter to ride onto the rounded bearing surface 196 of abutment member 191, and thus resulting in release of the detent 183. It consequently swings counterclockwise outwardly about its pivot pin 198 and releases the pallet P. The force exerted by spring resistance unit 215 may be adjusted, by provisions to be described, and may range from, say, 1000 pounds to 4000 pounds.

In the normal condition of the locks 180 for parachute delivery of the cargo in flight, the parts occupy the positions illustrated in FIG. 16 of the drawings, and it is to be remembered that upon release of an extraction parachute connected to a pallet P, the drag on the detent nose 184 imposes at the detent shoulder 193 a force on the abutment roller 210 of arm 205 tending to swing the same counterclockwise about the pivot pin 208.

As thus biased, the force applying roller 212 on arm 205 acts to the left (FIG. 16) upon a spacer tongue 217 which is pivotally mounted at 218 upon one arm 219 of a bell crank 220. This bell crank is itself pivoted by a pin 221 on a wall 222 of the housing 182. A second arm 223 of the same bell crank has a follower roller 224 journaled at the end thereof, which follower comes into play in the emergency lock and unlock control of the lock 180, as will be described. However, it is functionless in extraction parachute delivery of the pallets in opposition to the spring force exerted by the spring restraint unit 215, as presently to be described.

A small coiled tension spring 226, anchored to a wall 227 of housing 182 by a member 228 threaded into that wall, is connected at 229 to the arm 219 of bell crank 220. This spring 226 continually urges the spacer tongue 217 downwardly (FIG. 16) into the space between the force applying roller 212 and a further force receiving and transmitting roller 231.

The roller 231 is journaled in a forked stem or stud 232; and this stud is guided in a bushing 233 disposed in a hole in the housing wall 227. On the left-hand side of that wall, as viewed in FIG. 16, a reduced end 234 of the forked stud 232 threadedly receives a spring abutment disc 235, which is locked in place by a nut.

A strong coiled compression spring 237 is disposed in an elongated tubular, cup-like spring housing 238 threaded at its right-hand open end into the housing wall 227; and one end of spring 237 engages endwise against right-hand abutment disc 235. The opposite end of the spring 237 engages an adjusting disc 239; the disc 239 being adjustable axially of spring housing 238 through the agency of a stud 240 threaded through the closed end 241 of housing 238. Stud 240 has a reduced end 242 extending through a central hole of disc 239, the body of the stud having axial thrust engagement with adjusting disc 239.

Thus, upon threading manipulation of the stud 240, the degree of compression of spring 237 may be regulated to increase or diminish the force it exerts in opposition to movement of the right-hand abutment disc 235, hence to movement of the force receiving roller 231. It follows that, since the force applying roller 212 transmits force to roller 231 through the agency of spacer tongue 217, a corresponding opposition to counterclockwise movement of the arm 205 is exerted by spring 237; and that the arm 205 will remain in the position of FIG. 16 until the parachute drag force arises to a value sufficient to cause the abutment shoulder 193 to cam abutment roller 210 to the dotted line position to the right shown in FIG. 16. The bearing surface 196 of detent 183 thereupon rides past roller 210, for example as shown in FIGS. 22 and 23, detent locking nose 184 swinging outwardly through rail slot 33' to an inoperative release position corresponding to the positions of FIGS. 22 and 23.

In order to enable the compression of restraint spring 237 to be accurately adjusted, the adjusting disc 239 is provided with a small indicating pointer 244 radially threaded therein (see FIG. 20 in conjunction with FIG. 16), which pointer extends through an elongated slot 245 in the wall of spring housing 238. A nonlinearly calibrated indicia strip 246 is secured to the exterior of housing 238 adjacent the slot 245, the calibrations thereon being expressed in pounds over a range of, say, 1000 to 4000.

Thus, by manipulating adjusting stud 240 from the exterior and observing the pointer 244, an attendant or the installing personnel may readily and quickly adjust the compression of restraint spring 231 with considerable accuracy, hence the value in pounds at which detent 183 will be released or unlocked under extraction parachute drag.

Reference has been made to the small hole 185 in the nose 184 of detent 183. This is for the purpose of enabling a positive manual lock-out of any detent, independently of the parachute release just described or an emergency detent release to be described. To this end, a correspondingly sized hole 248 is formed in a horizontal flange of housing 182, and a lock-out pin 249 (FIG. 16) is stored adjacent.

Should there be occasion to hold any detent 183 in an unlocked position, as for inspection, servicing, or because of no need for it in a particular cargo loading, the bell crank 220 is manually swung clockwise about its pivot pin 221, thus withdrawing the spacer tongue 217 from between the force applying and receiving rollers 212, 231, respectively. This frees the abutment roller arm 205 for ready movement, in turn permitting the detent 183 to be swung counterclockwise against only force of the small spring 201. When sufficiently retracted to align the holes 185, 248, the lock-out pin 249 is inserted in the latter. This provides a positive lock-out of the detent 183 when it is not needed.

*Right-hand emergency control*

It is of course desirable, in any installation in which the left-hand restraint rail lock mechanisms 15 are simultaneously locked or unlocked through the agency of the left-hand emergency control 17, that a corresponding simultaneous emergency lock or unlock action be provided for the right-hand mechanisms 180. This function is, as indicated above, performed by manipulation of the control 19, hereinafter described in detail.

Its action involves the longitudinal actuation of individual emergency control rods, one for each lock 180, such rods being designated 252 in FIGS. 16, 17, 21, 22 and 23. They are articulated endwise for simultaneous, rigid mechanical fore and aft actuation, using suitable rod connectors 253 mounted to the opposite forked ends 254 of the respective rods 252, in the same general manner that the control rods 100 of the left-hand lock mechanisms 15 are articulated.

The individual emergency control rods 252 are of solid cylindrical cross section, and each thereof has a flat surfaced recess 256 on one side thereof, bounded at opposite aft and forward ends by inclined wedge surface ends 257, 258, respectively. Each rod is also provided on its side opposite the recess 256 with a further flat surfaced recess 259, which is bounded at its aft and forward ends by inclined holding wedge surfaces 260 and 261, respectively.

The respective opposite side recesses 256 and 259 are predeterminedly spaced axially from one another in a relation determined by the location of the bell crank follower roller 224 and the antifriction roller 189 of detent 183 relative to one another. The recesses 256 of all control rods 252 are of the same axial length, and this is also true of the recesses 259, since simultaneous emergency operation of all rods 252 in one manner or another is desired, rather than a sequential operation, as in one instance of the operation of the rods 100 of the left-hand rail installation 10.

Reference being had to FIGS. 16 and 21–23, it is seen that upon emergency or standby operation of right-hand master control 19 (FIGS. 13–15), the recesses 256 and 259 will coact respectively with the bell crank follower roller 224 and the detent roller 189 to produce various results.

In a normal extraction parachute delivery setting, in which the lock parts are as shown in FIG. 16, the bell crank follower 224 will be adjacent the approximate midpoint of recess 256, and the detent roller 189 will adjoin the flat of the recess 259. However, in another emergency control-operated condition of the right-hand locks 180, each of the respective control and operating rods 252 is in a position to the right (FIG. 16) in which the left-hand wedge end 261 of rod recess 259 abuts the side of the detent roller 189. This position will indicate to the control operator that the detent end 184 is properly engaged in the indent 34 of pallet P and the tongue 217 is fully engaged between rollers 212 and 231. This position is further referred to as the check position.

Starting with this check position, the loadmaster may manipulate the master control 19 in a manner to draw the control rods 252 to the left, as viewed in FIGS. 16 and 21–23.

The first effect of this is to cause the forward wedge end 261 of the recess 259 to depart from detent roller 189 to the position of FIGS. 16 and 22. This frees the detents 183 from swing to unlocked condition, but as opposed by the respective restraint spring units 215. The bell crank 220 remains as before, with its tongue 217 depending between the force-transmitting and receiving rollers 212, 232, and with its follower roller 224 adjacent rod recess 256, per FIG. 16; and the locks 180 are now set for parachute-responsive operation.

A further movement of the rod 252 to the left results in the aft or right-hand wedge end of recess 256 engaging and camming the bell crank follower to the left, with the result that the spacer tongue 217 is now withdrawn from between the force applying and receiving rollers 212, 231.

The abutment arm 205 is thus freed from opposition to its movement on the part of the restraint spring unit 215, and the lock detent 183 is free to move outwardly to released or unlocked position, in which it is shown in FIG. 22; the abutment roller 210 riding along the curved bearing surface 196 of the detent. The lock 180 is now out of its parachute-operated condition; and the detent 183 may be swung under very little pressure.

A still further movement of the rod 252 to the left under control of master control 19 (a fourth and final manipulation of the latter) causes the aft or right-hand wedge end 260 of its flatted recess 259 to engage the detent roller 189. The recess 259 affords sufficient clearance to permit roller 189 to swing to the left, the consequent retracting movement of the detent being limited by engagement of its stop portion 186 with the outer surface of rail 21, as appears in FIG. 22.

Hence the full and final movement of the rod 252 to the left causes the rod wedge end 260, in engaging the detent 183, to swing the detent fully counterclockwise, in the manner illustrated in FIG. 23. Since provision is made at master control 19, as will be described, to hold the rods 252 positively in all of the four positions, all right-hand detents 183 are positively locked out of action in this final phase. The bell crank follower roller 224, having previously been actuated by the recess right-hand wedge end 257, simply rides along the diameter of the rod 252. Thus, there is provided a positive, automatic lock-out of all lock mechanisms 180, over and above the manual lock-out made possible by the pin 249.

Should it be desired to restore the detents 183 to their previous position, either for spring-resisted parachute delivery of the pallets, or to check position, the rods 252 are shifted from master control 19 in the opposite direction, or to the right in FIGS. 16, 21, 22 and 23. Firstly, this releases the detent rollers 189 from the positive lockout condition of FIG. 23. Secondly, in a further increment of rod movement to the right, the bell crank follower 224 drops into recess 256; and the spring 226 becomes effective to reinsert spacer tongue 217 between the force transmitting and receiving rollers 212, 231, when this is permitted by detent bearing surface 196; and it is permitted when the small detent spring 201 swings detent 183 clockwise. The lock is then in condition for parachute operation with the spacer tongue 217 between rollers 212 and 231.

A further movement of the rod 252 to the right causes the left-hand wedge end 261 of recess 259 to engage the detent roller 189, so that all detents 183 and tongue 217 are positively indicated to be in an operative position with detent ends 184 properly engaged in the side indents or slots of pallet P and tongues 217 fully engaged between rollers 212 and 231.

*Right-hand master control*

Reference should now be had to FIGS. 13, 14 and 15, in conjunction with FIG. 24 showing the general layout of the right-hand master control 19 in relation at the control station S to the left-hand master control 17.

Control 19 comprises a suitable shielding housing 264 bolted or otherwise rigidly secured to the floor or deck of the cargo compartment to shield certain operating parts of the control 19. These include a releasable pawl type operating arm or lever 265 which is pivoted at 266 to one side of an upright detent plate 267, plate 267 being carried on a base plate 268 bolted in place on the floor or deck. Plate 267 is provided with four locking notches 269 spaced about an arcuate upper edge thereof; and the operating arm 265 is provided with a pawl 270 adapted to be operated from a finger button 271 at the end of the arm; so that this pawl can be selectively engaged in any of the locking notches 269, which are numbered 1, 2, 3 and 4 for visual reference.

A master control rod 273 is pivoted on a small bracket 274 secured to the operating arm 265 outwardly of its detent plate pivot at 266; and the control rod 273 is pivoted at its opposite end to the outer end of a crank arm 275. Arm 275 is itself pivoted on a suitably anchored bracket piece 276. Medially of its length, the crank arm 275 has pivoted thereto a connecting link 278, the link 278 extending outwardly to a pivotal connection at 279 with a generally triangular rocker plate 280. Rocker plate 280 is pivoted at 281 between angle brackets 282 secured to the forward end of the right-hand restraint rail 21; and a primary lock-operating rod 283 is pivoted to the rocker plate 280.

Rod 283 extends aft to an appropriate connection to the forwardmost of the series of articulated connecting and lock control rods 253, 252, respectively, as illustrated in FIG. 16, thus enabling the desired master automatic operation of the right-hand locks 180 from control 19.

In the operation of this control the arrangement provides four possible settings, as determined by the placement of the operating of the arm pawl 270 in one or the other of the numbered notches 269. These options are as follows:

*Position #1.*—The rods 252 are in a relatively deep aftward position, with the forward wedge ends 261 of their respective recesses 259 engaged with detent roller 189. Each lock is now positively indicated to be in the proper operative, check position.

*Position #2.*—Check position is released; and the lock is in condition for extraction parachute operation (FIG. 16).

*Position #3.*—The locks 180 are unlocked by engagement of wedge end 257 of recess 256 with bell crank follower 224 to withdraw tongue 217 upwardly, and thus condition the lock for manual or emergency operation (FIG. 21).

*Position #4.*—The aft wedge end 260 of recess 259 engages detent roller 189, and the lock is positively locked out in released condition.

Of course, a reverse movement of the control operating arm 265 reverses the phasing just decribed.

*Arrangement and operation in general*

The left and right hand restraining rails 10, 11, respectively, are intended to receive loaded pallets P at an aft loading opening (not shown) of the aircraft cargo space, these units being delivered from a conventional fork lift, or being winched up a hinged, roller-type loading ramp (not shown). Since such ramp swings forwardly and downwardly, once the center of gravity of the forwardly advancing load passes the hinge pivot of the ramp section, the vertical restraining flanges 24 of the respective left and right restraining rail structures 13, 22 are cut away for several feet at the rear of the rails, enabling the pallet side flanges 35 to swing down into alignment to the aft of and beneath the level of restraining rail flanges 24, whence they travel forwardly as restrained from above by the latter.

As appears in FIG. 24, the load, schematically represented as a military tank vehicle V, is anchored to the pallet P, as by tie down straps; and has cushioned support on the pallet to avoid damage at the end of its pallet drop, as by means of cellular paperboard honeycomb cushion units C. The load may be otherwise restrained in the cargo space, as by existing floor tie down rings (not shown). Furthermore, suitable individual locking clips (not shown) may be provided for quick application to the respective left and right hand rails 13, 21, for the purpose of individually locking the loads in any desired place and/or at the respective load stations.

With the loaded pallets P positioned as desired, the loadmaster may manipulate the left-hand sequential operating arm 128 of master control 17 in an indexing fashion to successively lock the pallets in place in the direction from forward to aft, sequentially straightening the toggle detent locking linkages of the respective locks 15, in the manner described above in connection with FIGS. 2A and 8 through 11. The rod control pin 113 (FIG. 12) of each lock 15, in engaging into the slot 116 of a left-hand control rod 100, as when a rod has not been fully locked in the position of FIG. 8, insures against any possible locking manipulation of the lock 15 immediately to the rear, should any given lock itself fail to take intended locked position, thus permitting an attendant to inspect and correct the situation at that lock.

As indicated above, the sequence of unlocking the locks is from aft to forward, upon engagement of the respective wedge surfaces 102 of rods 100 with the follower roller 91 of the respective toggle linkages, which takes place in the aft to forward sequence by reason of the differing axial lengths of the flatted rod recesses 101.

In the event of an emergency or the arising of a condition requiring the immediate unloading or jettisoning of any or all of the pallets, a manipulation of the emergency bail arm 150 by the loadmaster causes the tubular rods 164 to be simultaneously drawn forward, in turn actuating the angled emergency arms 95 (FIG. 2B), with resultant breaking of the toggle linkages connected to the hooked detent pin lock members 58. A reverse manipulation to the aft of the emergency bail arm 150 results in restoration of the toggles to locked condition, through the agency of the respective individual springs thereof. This is also occasioned positively by the engagement of the abrupt recess surfaces 103 with the toggle bell crank followers 91 when the sequence control arm 128 is set for indexing operation to restore the locks.

Assuming that the left-hand locks 15 have been unlocked, sequence-wise or emergency-wise as described, an apropriate setting of the righthand master control 19, to place the pawl 270 of operating arm 265 in Position #2 of the detent plate 267 (FIG 14), the right-hand assembly 11 is conditioned for extraction parachute operation against the opposition of the respective spring restraint units 215. On the other hand, with the control arm in Position #3, all locks 180 are freed from control restraint, other than by their small individual springs 201; while with the operating arm set at Position #1 all locks 180 are positively indicated to be in the proper operative position; and with the operating arm set at Position #4, all locks 180 are maintained in a locked-out position.

Individual positive lockouts of the detents 183 of lock 180 may also be had by use of the individual lockout pins 249, inserting the same in the detent hole 185 and the flange hole 248. This is also true of the locks of the left-hand rail.

The provision of the indicator pointer 244 on each right-hand spring restraint unit 215 greatly facilitates and expedites the adjustment of the compression of its restraint spring 237. Similarly, the provision of the calibrated indicator structure for the left-hand rail assembly 10, as shown in FIG. 1C, makes it possible for the loadmaster to instantaneously ascertain at any time the condition of the locks 15 of the left-hand side.

Summary

It is seen from the foregoing that the invention provides an improved aircraft cargo handling system for logistical ground loading and unloading, as well as for the in-flight air delivery of military material under extraction parachute drag. This system is in full compliance with exacting governmental procurement specifications.

Its parts are of simple and lightweight construction yet have necessary strength for reliability of operation. They are also capable of simple and rapid installation in the cargo space of the aircraft, and are located for ample and rapid access for inspection or servicing. The restraining rails 13, 21 are capable of acting on load-supporting pallets or platforms of a standard design in a manner to afford necessary vertical and side horizontal restraint of such pallets and their loads; and the locking mechanisms 15 and 180 afford positive forward and aft variable restraint of the pallets P, yet are readily and easily released from this condition by manual manipulation of emergency control means 17 or 19 at a single master control unit or station S. The locks of one of the rails are further such as to permit automatic extraction parachute load release, yet permit of optional manual control within the cargo compartment for a shifting of the loads as desired.

The installation is proof against jamming of its operating components, and is structurally standardized to the maximum possible extent. Its components are in the main operable using standard hand tools, etc. Control features are such as to be capable of operation by a relatively slight physical effort on the part of the loadmaster, who has instantaneous and convenient access to both the left-hand and the right-hand master controls 17, 19 at station S in governing the loading and unloading procedure.

What we claim as our invention is:

1. A cargo loading system comprising a pair of parallel, longitudinally extending restraint rails between which cargo load units may travel, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, said lock mechanisms being of uniform design and being disposed with the respective detents thereof in the same relation to the respective load units in restrainingly engaging the latter, and means providing a master control unit operatively connected to the respective individual detent operating means of said lock mechanisms of the respective restraint rails for the automatic control of all of said mechanisms from said master control unit to permit successive release of said detents from restraining engagement with load units.

2. A cargo loading system comprising a pair of parallel, longitudinally extending restraint rails between which cargo load units may travel, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, said lock mechanisms being of uniform design and being disposed with the respective detents thereof in the same relation to the respective load units in restrainingly engaging the latter, and means providing a master control unit operatively connected to the respective individual detent operating means of said lock mechanisms of the respective restraint rails for the control of all of said mechanisms from said master control unit, said master control means including means for the optional sequential or simultaneous operation of the mechanisms of one rail.

3. A cargo loading system comprising a pair of parallel, longitudinally extending restraint rails between which cargo load units may travel, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, said lock mechanisms being of uniform design and being disposed with the respective detents thereof in the same relation to the respective load units in restrainingly engaging the latter, and means providing a master control unit operatively connected to the respective individual detent operating means of said lock mechanisms of the respective restraint rails for the control of all of said mechanisms from said master control unit, said master control means including means for the optional sequential or simultaneous operation of the mechanisms of one rail and means for the simultaneous operation of the mechanisms of the other rail.

4. A cargo loading system comprising a pair of parallel, longitudinally extending restraint rails between which cargo load units may travel, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, and means providing a master control unit operatively connected to the respective individual detent operating means of said lock mechanisms of the respective restraint rails for the control of all of said mechanisms from said master control unit, said master control means including means for the optional sequential or simultaneous operation of the mechanisms of one rail and means for the simultaneous operation of the mechanisms of the other rail, the mechanisms of one of said rails including means resiliently resisting movement of the detents thereof out of load unit restraining engagement under parachute drag force.

5. A cargo loading system comprising a pair of parallel, longitudinally extending restraint rails between which cargo load units may travel, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, and means providing a master control unit operatively connected to the respective individual detent operating means of said lock mechanisms of the respective restraint rails for the control of all of said mechanisms from said master control unit, said master control means including means for the optional sequential or simultaneous operation of the mechanisms of one rail and means for the simultaneous operation of the mechanisms of the other rail; the mechanisms of said other rail including means resiliently resisting movement of the detents thereof out of load unit restraining engagement under parachute drag force.

6. A cargo loading system comprising a pair of parallel, longitudinally extending restraint rails between which cargo load units may travel, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, and means providing a master control unit operatively connected to the respective individual detent operating means of said lock mechanisms of the respective restraint rails for the control of all of said mechanisms from said master control unit, said master control means including means for the optional sequential or simultaneous operation of the mechanisms of one rail and means for the simultaneous operation of the mechanisms of the other rail, the mechanisms of said other rail including means resiliently resisting movement of the detents thereof out of load unit restraining engagement, said master control unit including means to optionally place said resilient restraining means into and out of effect.

7. A cargo loading system comprising a pair of parallel, longitudinally extending restraint rails between which cargo load units may travel, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, and means providing a master control unit operatively connected to the respective individual detent operating means of said lock mechanisms of the respective restraint rails for the control of all of said mechanisms from said master control unit, said master control means including means for the optional sequential or simultaneous operation of the mechanisms of one rail and means for the simultaneous operation of the mechanisms of the other rail, the mechanisms of said other rail including means resiliently resisting movement of the detents thereof out of load unit restraining engagement, said master control unit including means to optionally place said resilient restraining means into and out of effect, and means to positively hold the lock mechanisms of one rail in said load unit restraining position, and to positively hold the lock mechanisms of said other rail in one direction, said resilient means restraining said last named locks in the other direction.

8. A cargo loading system comprising a pair of parallel, longitudinally extending restraint rails between which cargo load units may travel, each rail being provided with upright, longitudinally extending portions respectively acting to restrain the load units laterally at the sides thereof and vertically from above, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, and means providing a master control unit operatively connected to the respective individual detent operating means of said lock mechanisms of the respective restraint rails for the control of all of said mechanisms from said master control unit, said master control means including means for the optional sequential or simultaneous operation of the mechanisms of one rail and means for the simultaneous operation of the mechanisms of the other rail, the mechanisms of said other rail including means resiliently resisting movement of the detents thereof out of load unit restraining engagement, said master control unit including means to optionally place said resilient restraining means into and out of effect, and means to positively hold the lock mechanisms of one rail in and out of said load unit restraining position, and to positively hold the lock mechanisms of said other rail in one direction, said resilient means restraining said last named locks in the other direction.

9. A cargo loading system comprising a pair of parallel, longitudinally extending restraint rails between which cargo load units may travel, each rail being provided with upright, longitudinally extending portions respectively acting to restrain the load units laterally at the sides thereof and vertically from above, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit, and means providing a master control unit operatively connected to the respective individual detent operating means of said lock mechanisms of the respective restraint rails for the automatic control of all of said mechanisms from said master control unit to permit successive release of said detents from restraining engagement with load units.

10. A cargo loading system comprising a pair of parallel, longitudinally extending restraint rails between which cargo load units may travel, each rail being provided with upright, longitudinally extending portions respectively acting to restrain the load units laterally at the sides thereof and vertically from above, a load roller unit between said rails sustaining said load units for said travel, and a bumper fixedly mounted on at least one of said rails for impact engagement by a unit so traveling, said bumper comprising a side upright flange rigidly secured to a side of the rail, an upright stop plate rigidly secured to said flange to extend transversely of the latter for impact engagement by the load unit, and generally horizontal plates secured to said flange and opposite sides of the stop plate, one of said horizontal plates being of arcuate cross section to yield and cushion shock upon said impact engagement of the stop plate, each rail being provided at longitudinally spaced points therealong with a series of lock mechanisms, each of which has a detent releasably engageable with a load unit to restrain the latter in the longitudinal direction and individual means to operate said detent into and out of restraining engagement with the load unit.

11. A cargo loading system comprising a pair of parallel, longitudinally extending restraint rails between which cargo load units may travel, each rail being provided with upright, longitudinally extending portions respectively acting to restrain the load units laterally at the sides thereof and vertically from above, a load roller unit between said rails sustaining said load units for said travel, and a bumpr fixedly mounted on at least one of said rails for impact engagement by a unit so traveling, said bumper comprising a side upright flange rigidly secured to a side of the rail, an upright stop plate rigidly secured to said flange to extend transversely of the latter for impact engagement by the load unit, and generally horizontal plates secured to said flange and opposite sides of the stop plate, one of said horizontal plates being of arcuate cross section to yield and cushion shock upon said impact engagement of the stop plate, each rail being provided at longitudinally spaced points therealong with a series of lock mechanisms, each of which has a detent releasably engageable with a load unit to restrain the latter in the longitudinal direction.

12. A cargo loading system comprising a pair of parallel, longitudinally extending restraint rails between which cargo load units may travel, each rail being provided with upright, longitudinally extending portions respectively acting to restrain the load units laterally at the sides thereof and vertically from above, a load roller unit between said rails sustaining said load units for said travel, and a bumper fixedly mounted on at least one of said rails for impact engagement by a unit so traveling, said bumper comprising a side upright flange rigidly secured to a side of the rail, an upright stop plate rigidly secured to said flange to extend transversely of the latter for impact engagement by the load unit, and generally horizontal plates secured to said flange and opposite sides of the stop plate, one of said horizontal plates being of arcuate cross section to yield and cushion shock upon said impact engagement of the stop plate.

13. A cargo loading system comprising a pair of parallel, longitudinally extending restraint rails between which cargo load units may travel, a load roller unit between said rails sustaining said load units for said travel, and a bumper fixedly mounted on at least one of said rails for impact engagement by a unit so traveling, said bumper comprising a side upright flange rigidly secured to a side of the rail, an upright stop plate rigidly secured to said flange to extend transversely of the latter for impact engagement by the load unit, and generally horizontal plates secured to said flange and opposite sides of the stop plate, one of said horizontal plates being of arcuate cross section to yield and cushion shock upon said impact engagement of the stop plate, and means providing a master control unit operatively connected to the respective individual detent operating means of said lock mechanisms of the respective restraint rails for the control of all of said mechanisms from said master control unit.

14. An aircraft cargo handling system, comprising a longitudinally extending load restraint rail, a series of locks spaced longitudinally of said rail, each lock including a detent movable transversely of said rail into and out of position for longitudinal restraining engagement with a load unit, and means to positively but releasably hold the detent in load unit restraining position, and a selectively actuable master control for said locks operatively connected to the respective holding means thereof, said control comprising an indexable sequence operating member, means operatively connected to said operating member, said last named means being operatively engageable sequentially with said respective detent holding means of said locks to effect sequential movement of said detents into and out of load unit restraining position, an emergency operating member, and means operatively connecting said emergency member with said respective detent holding means of said locks to simultaneously effect movement of said detents out of said restraining position upon actuation of said emergency operating member.

15. An aircraft cargo handling system, comprising a longitudinally extending load restraint rail, a series of locks spaced longitudinally of said rail, each lock including a detent movable transversely of said rail into and out of position for longitudinal restraining engagement with a load unit, and a toggle linkage to positively but releasably hold the detent in load unit restraining position, and a selectively actuable master control for said locks operatively connected to the respective linkages thereof, said control comprising an indexable sequence operating member, rigid rod means operatively connected to said operating member, said rod means being operatively engageable sequentially with said respective detent linkages of said locks to effect sequential movement of said detents into and out of load unit restraining position, an emergency operating member, and rigid means operatively connecting said emergency member with said respective detent holding linkages of said locks to simultaneously effect movement of said detents out of said restraining position upon actuation of said emergency operating member.

16. An aircraft cargo handling system, comprising a longitudinally extending load restraint rail having means to impose vertical restraint from above and horizontal side restraint on a load unit loaded longitudinally of said rail, a series of locks spaced longitudinally of said rail, each lock including a detent movable transversely of said rail into and out of position for longitudinal restraining engagement with a load unit, and means to positively but releasably hold the detent in load unit restraining position, and a selectively actuable master control for said locks operatively connected to the respective holding means thereof, said control comprising an indexable sequence operating member, means operatively connected to said operating member, said last named means being operatively engageable sequentially with said respective detent holding means of said locks to effect sequential movement of said detents into and out of load unit restraining position, an emergency operating member, and means operatively connecting said emergency member with said respective detent holding means of said locks to simultaneously effect movement of said detents out of said restraining position upon actuation of said emergency operating member.

17. An aircraft cargo handling system, comprising a longitudinally extending load restraint rail, a series of locks spaced longitudinally of said rail, each lock including a detent movable transversely of said rail into and out of position for longitudinal restraining engagement with a load unit, and means to positively but releasably hold the detent in load unit restraining position, and a selectively actuable master control for said locks operatively connected to the respective holding means thereof, said control comprising an indexable sequence operating member, means operatively connected to said operating member, said last named means being operatively engageable sequentially with said respective detent holding means of said locks to effect sequential movement of said detents into and out of load unit restraining position, an emergency operating member, means operatively connecting said emergency member with said respective detent holding means of said locks to simultaneously effect movement of said detents out of said restraining position upon actuation of said emergency operating member, and means for selectively actuating said sequence and emergency operating members from a common master control station.

18. An aircraft cargo handling system, comprising a longitudinally extending load restraint rail having means to impose vertical restraint from above and horizontal side restraint on a load unit loaded longitudinally of said rail, a series of locks spaced longitudinally of said rail, each lock including a detent movable transversely of said rail into and out of position for longitudinal restraining engagement with a load unit, and a toggle linkage to positively but releasably hold the detent in load unit restraining position, and a selectively actuable master control for said locks operatively connected to the respective linkages thereof, said control comprising an indexable sequence operating member, rigid rod means operatively connected to said operating member, said rod means being operatively engageable sequentially with said respective detent linkages of said locks to effect sequential movement of said detents into and out of load unit restraining position, an emergency operating member, rigid means operatively connecting said emergency member with said respective detent holding linkages of said locks to simultaneously effect movement of said detents out of said restraining position upon actuation of said emergency operating member, and means for selectively actuating said sequence and emergency operating members from a common master control station.

19. A system in accordance with claim 15, in which said sequence operating member comprises an adjustably reversible ratchet arm operatively connected to said first named rod means to sequentially actuate the latter in opposite locking and unlocking directions in accordance with the adjustment of said ratchet arm.

20. A system in accordance with claim 15, in which said emergency operating member comprises a swingable arm provided with a bell crank operating connection to said rigid means.

21. A system in accordance with claim 15, in which said sequence operating member comprises an adjustably reversible ratchet arm operatively connected to said first named rod means to sequentially actuate the latter in opposite locking and unlocking directions in accordance with the adjustment of said ratchet arm, said emergency operating member comprising a swingable arm provided with a bell crank operating connection to said rigid means.

22. An aircraft cargo handling system, comprising a longitudinally extending load restraint rail, a series of locks spaced longitudinally of said rail, each lock including a detent movable transversely of said rail into and out of position for longitudinal restraining engagement with a load unit, and a resiliently loaded unit to hold the detent in load unit restraining position under predetermined parachute drag on the load unit.

23. An aircraft cargo handling system, comprising a longitudinally extending load restraint rail, a series of locks spaced longitudinally of said rail, each lock including a detent movable transversely of said rail into and out of position for longitudinal restraining engagement with a load unit, and a resiliently loaded unit to hold the detent in load unit restraining position under predetermined parachute drag on the load unit, and a selectively actuable master control for said locks operatively connected thereto for the simultaneous control of the operation thereof.

24. An aircraft cargo handling system, comprising a longitudinally extending load restraint rail, a series of locks spaced longitudinally of said rail, each lock including a detent movable transversely of said rail into and out of position for longitudinal restraining engagement with a load unit, and a resiliently loaded unit to hold the detent in load unit restraining position under predetermined parachute drag on the load unit, said detent holding unit comprising an abutment member engageable with the detent to hold the latter in load unit engaging position, and a preloaded spring to releasably hold said abutment member in said position under parachute extraction force exerted by the load unit on the detent up to a predetermined value.

25. An aircraft cargo handling system, comprising a longitudinally extending load restraint rail, a series of locks spaced longitudinally of said rail, each lock including a detent movable transversely of said rail into and out of position for longitudinal restraining engagement with a load unit, and a resiliently loaded unit to hold the dent in load unit restraining position under predetermined parachute drag on the load unit, said detent holding unit comprising an abutment member engageable with the detent to hold the latter in load unit engaging position, a preloaded spring to releasably hold said abutment member in said position under parachute extraction force exerted by the load unit on the detent up to a predetermined value, and a connector member releasably positioned between said spring and abutment member to transmit spring force therebetween.

26. An aircraft cargo handling system, comprising a longitudinally extending load restraint rail, a series of locks spaced longitudinally of said rail, each lock including a detent movable transversely of said rail into and out of position for longitudinal restraining engagement with a load unit, and a resiliently loaded unit to hold the detent in load unit restraining position under predetermined parachute drag on the load unit, and a selectively actuable master control for said locks operatively connected thereto for the simultaneous control of the operation thereof, said detent holding unit comprising an abutment member engageable with the detent to hold the latter in load unit engaging position, a preloaded spring to releasably hold said abutment member in said position under parachute extraction force exerted by the load unit on the detent up to a predetermined value, and a connector member releasably positioned between said spring and abutment member to transmit spring force therebetween, said master control having rigid rod means operatively connecting the same to said connector member to withdraw the latter from between said spring and abutment member.

27. An aircraft cargo handling system, comprising a longitudinally extending load restraint rail, a series of locks spaced longitudinally of said rail, each lock including a detent movable transversely of said rail into and out of position for longitudinal restraining engagement with a load unit, and a resiliently loaded unit to hold the detent in load unit restraining position under predetermined parachute drag on the load unit, and a selectively actuable master control for said locks operatively connected thereto for the simultaneous control of the operation thereof, said detent holding unit comprising an abutment member engageable with the detent to hold the latter in load unit engaging position, a preloaded spring to releasably hold said abutment member in said position under parachute extraction force exerted by the load unit on the detent up to a predetermined value, and a connector member releasably positioned between said spring and abutment member to transmit spring force therebetween, said master control having rigid rod means operatively connecting the same to said connector member to withdraw the latter from between said spring and abutment member, and means to actuate said last named rod means from a remote master control station to so withdraw said connector member, and thus interrupt force transmission between said spring and abutment member.

28. An aircraft cargo handling system, comprising a longitudinally extending load restraint rail, a series of locks spaced longitudinally of said rail, each lock including a detent movable transversely of said rail into and out of position for longitudinal restraining engagement with a load unit, and a resiliently loaded unit to hold the detent in load unit restraining position under predetermined parachute drag on the load unit, and a selectively actuable master control for said locks operatively connected thereto for the simultaneous control of the operation thereof, said detent holding unit comprising an abutment member engageable with the detent to hold the latter in load unit engaging position, a preloaded spring to releasably hold said abutment member in said position under parachute extraction force exerted by the load unit on the detent up to a predetermined value, and a connector member releasably positioned between said spring and abutment member to transmit spring force therebetween, said master control having rigid rod means operatively connecting the same to said connector member to withdraw the latter from between said spring and abutment member, and means to actuate said last named rod means from a remote master control station to so withdraw said connector member, and thus interrupt force transmission between said spring and abutment member, said last named rod means being engageable with the detent to lock the latter in or out of said restraining position.

29. An aircraft cargo handling system, comprising a longitudinally extending load restraint rail, a series of locks spaced longitudinally of said rail, each lock including a detent movable transversely of said rail into and out of position for longitudinal restraining engagement with a load unit, and means to positively but releasably hold the detent in load unit restraining position, and a selectively actuable master control for said locks, said control comprising an indexable sequence operating member operatively connected to respective holding means to control sequential movement of said detents into and out of load unit restraining position, and means preventing operation of the holding means of any given lock to place its detent in said last named position until the detent of a more forward lock of said series has been placed in said last named position.

30. An aircraft cargo handling system, comprising a longitudinally extending load restraint rail, a series of locks spaced longitudinally of said rail, each lock including a detent movable transversely of said rail into and out of position for longitudinal restraining engagement with a load unit, and means to positively but releasably hold the detent in load unit restraining position, and a selectively actuable master control for said locks, said control comprising an indexable sequence operating member operatively connected to respective holding means to control sequential movement of said detents into and out of load unit restraining position, and means preventing operation of the holding means of any given lock to place its detent in said last named position until the detent of a more forward lock of said series has been placed in said last named position, said preventing means including a member responsive to a positioning of said detent out of said restraining position to prevent the holding means of a more aft lock to assume its detent holding position.

31. A cargo loading system comprising a longitudinally extending restraint rail along which cargo load units may travel, said rail being provided at longitudinally spaced points therealong with a series of lock mechanisms, each of which has a detent releasably engageable with a load unit to restrain the latter in the longitudinal direction, and means to operate said detent into and out of restraining engagement with the load unit, said lock mechanisms being of uniform design and being disposed with the respective detents thereof in the same relation to the respective load units in restrainingly engaging the latter, and means providing a master control unit operatively connected to the respective individual detent operating means of said lock mechanisms for the automatic control of said mechanisms from said master control unit to permit successive release of said detents from restraining engagement with load units.

32. A cargo loading system comprising longitudinally extending means along which cargo load units may travel, and a fixed bumper adjacent said longitudinally extending means for impact engagement by a unit so traveling in one longitudinal direction, said bumper comprising a fixed upright stop plate extending transversely of said last named direction for impact engagement by the load unit, a generally horizontal plate extending from a side of said stop plate in a direction opposite of said longitudinal direction, said horizontal plate being of arcuate cross section and being rigidly connected in stress receiving relation to said stop plate to yield and cushion shock upon said impact engagement of the stop plate.

33. A cargo loading system comprising longitudinally extending means along which cargo load units may travel, and a fixed bumper adjacent said longitudinally extending means for impact engagement by a unit so traveling in one longitudinal direction, said bumper comprising a fixed upright stop plate extending transversely of said last named direction for impact engagement by the load unit, generally horizontal plates rigidly connected to and extending from opposite sides of the stop plate, one of said horizontal plates being of arcuate cross section and extending oppositely of said longitudinal direction to yield and cushion shock upon said impact engagement of the stop plate.

34. A cargo loading system comprising longitudinally extending means along which cargo load units may travel, said means being provided with lock mechanisms respectively acting to longitudinally restrain load units, and a fixed bumper adjacent said longitudinally extending means for impact engagement by a unit so traveling in one longitudinal direction, said bumper comprising a fixed upright stop plate extending transversely of said last named direction for impact engagement by the load unit, generally horizontal plates rigidly connected to and extending from opposite sides of the stop plate, one of said horizontal plates being of arcuate cross section and extending oppositely of said longitudinal direction to yield and cushion shock upon said impact engagement of the stop plate.

35. In a cargo handling system which includes an elongated cargo storage area for holding a plurality of cargo-carrying pallets and a plurality of latches spaced at predetermined distances for securing said pallets, the improvement comprising: rigid elongated cam means movably mounted along the length of said cargo storage area; and a plurality of latch operating means on said cam means for engaging and operating said latches, said latch operating means spaced at predetermined locations along said cam means and positioned in such operable relationship with respect to said latches as to engage and operate said latches sequentially as said cam means is moved longitudinally along said cargo storage area.

36. The cargo loading system of claim 31, in which said master control unit has means operatively connected to said operating means of said detents to simultaneously release all of the latter.

37. The cargo handling system of claim 35, and further comprising a master unit having means for selectively controlling the operation of said latches either sequentially, as described, or simultaneously as a group.

38. A cargo handling system for installation in an aircraft cargo interior, comprising a series of locks spaced longitudinally of said interior, each lock including a detent movable into and out of position for longitudinal restraining engagement with a load unit, and a resiliently loaded unit to hold the detent in load unit restraining position under predetermined parachute drag on the load unit, and a selectively actuable master control for said locks operatively connected thereto for the simultaneous control of the operation thereof.

References Cited

UNITED STATES PATENTS

| | | | |
|---|---|---|---|
| 2,442,549 | 6/1948 | Pearlman | 214—38.8 |
| 2,710,105 | 6/1955 | Schwartz | 214—83.24 |
| 3,093,092 | 11/1963 | Martin et al. | 244—137 XR |

ARTHUR L. LA POINT, *Primary Examiner.*

FERGUS S. MIDDLETON, *Examiner.*

A. E. CORRIGAN, D. E. HOFFMAN,
*Assistant Examiners.*